(12) United States Patent
Mayster et al.

(10) Patent No.: US 12,435,984 B2
(45) Date of Patent: Oct. 7, 2025

(54) DISCOVERY AND RANKING OF LOCATIONS FOR USE BY GEOGRAPHIC CONTEXT APPLICATIONS

(71) Applicant: Google LLC, Mountain View, CA (US)

(72) Inventors: Yan Mayster, Aurora, CO (US); Brian Edmond Brewington, Superior, CO (US); Brian Daniel Shucker, Superior, CO (US); Marcus Bulach, Pyrmont (AU)

(73) Assignee: GOOGLE LLC, Mountain View, CA (US)

( * ) Notice: Subject to any disclaimer, the term of this patent is extended or adjusted under 35 U.S.C. 154(b) by 498 days.

(21) Appl. No.: 16/972,486

(22) PCT Filed: Jan. 7, 2019

(86) PCT No.: PCT/US2019/012520
§ 371 (c)(1),
(2) Date: Dec. 4, 2020

(87) PCT Pub. No.: WO2020/131136
PCT Pub. Date: Jun. 25, 2020

(65) Prior Publication Data
US 2021/0270621 A1    Sep. 2, 2021

Related U.S. Application Data

(60) Provisional application No. 62/780,706, filed on Dec. 17, 2018.

(51) Int. Cl.
*G01C 21/34*    (2006.01)
*G01C 21/36*    (2006.01)
(Continued)

(52) U.S. Cl.
CPC ..... *G01C 21/3461* (2013.01); *G01C 21/3629* (2013.01); *G01C 21/3691* (2013.01);
(Continued)

(58) Field of Classification Search
None
See application file for complete search history.

(56) References Cited

U.S. PATENT DOCUMENTS

2014/0067257 A1* 3/2014 Dave ................. H04W 4/40
701/423
2016/0086036 A1* 3/2016 Kuroki ............ H04N 1/00323
348/135

(Continued)

FOREIGN PATENT DOCUMENTS

CN    107636649    1/2018
CN    108337907    7/2018

OTHER PUBLICATIONS

International Preliminary Report on Patentability for Application No. PCT/US2019/012520, mailed Jul. 1, 2021, 12 pages.
(Continued)

*Primary Examiner* — Navid Z. Mehdizadeh
*Assistant Examiner* — Jason R Roberson
(74) *Attorney, Agent, or Firm* — DORITY & MANNING P.A.

(57) ABSTRACT

Provided are methods, systems, devices, apparatuses, and tangible non-transitory computer readable media for navigation and geocoding. The disclosed technology can perform operations including accessing location data and semantic tags. The location data can include information associated with interactions at locations. Each semantic tag can include information associated with one of the locations. Further, each semantic tag can be descriptive of features associated with the respective location. The location data (Continued)

and the plurality of semantic tags that satisfy suitability criteria can be identified. The suitability criteria can be associated with the suitability of each location for use by a geographic context application. A suitable location can be determined based on the location data and the semantic tags that satisfy the suitability criteria. Furthermore, the indications including a description of the suitable location can be generated based on the features associated with the suitable location.

19 Claims, 13 Drawing Sheets

(51) Int. Cl.
*G01S 19/42* (2010.01)
*G06F 16/2457* (2019.01)
*G06F 16/29* (2019.01)
*H04L 67/52* (2022.01)

(52) U.S. Cl.
CPC ........ *G01S 19/42* (2013.01); *G06F 16/24578* (2019.01); *G06F 16/29* (2019.01); *H04L 67/52* (2022.05)

(56) References Cited

U.S. PATENT DOCUMENTS

| | | | | |
|---|---|---|---|---|
| 2017/0138752 | A1* | 5/2017 | Mermelstein | G08G 1/161 |
| 2017/0351924 | A1* | 12/2017 | Hotta | H04N 7/18 |
| 2017/0356748 | A1* | 12/2017 | Iagnemma | G01C 21/34 |
| 2018/0245927 | A1* | 8/2018 | Frish | G01C 21/3841 |

OTHER PUBLICATIONS

International Search Report for PCT/US2019/012520, mailed on Jun. 17, 2019, 2 pages.
Chinese Search Report for corresponding Application No. 2019800532127, dated Sep. 19, 2023, English translation unavailable, 2 pages.

* cited by examiner

DISCOVERY AND RANKING OF LOCATIONS FOR USE BY GEOGRAPHIC CONTEXT APPLICATIONS

PRIORITY CLAIM

The present application is based on and claims is based on and claims the right of priority under 35 U.S.C. § 371 to U.S. Provisional Application No. 62/780,706 filed on Dec. 17, 2018; and International Application No. PCT/US2019/012520 filed on Jan. 7, 2019. Applicant claims priority to and the benefit of each of such applications and incorporates all such applications herein by reference in their entirety.

FIELD

The present disclosure relates generally to navigation and geocoding. More particularly, the present disclosure relates to determining locations for use by geographic context applications operating on a computing device.

BACKGROUND

Operations associated with the state of a geographic area can be implemented on a variety of computing devices. These operations can include processing data associated with the geographic area for later access and use by a user or computing system. Further, the operations can include exchanging data with remote computing systems. However, the types of operations that are performed and the way in which the operations are performed can vary over time, as can the underlying hardware that implements the operations. Accordingly, there are different ways to leverage computing resources associated with the state of a geographic area.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method of determining a location suitable for use by a geographic context application. The computer-implemented method can include accessing, by a computing system including one or more processors, location data and a plurality of semantic tags. The location data can include information associated with one or more interactions at one or more locations. Each semantic tag of the plurality of semantic tags can include information associated with a respective location of the one or more locations. Further, each semantic tag can be descriptive of one or more features associated with the respective location. The computer-implemented method can also include identifying, by the computing system, the location data and the plurality of semantic tags that satisfy one or more suitability criteria associated with suitability of each location for use by a geographic context application. The computer-implemented method can include determining, by the computing system, a suitable location of the one or more locations based at least in part on the location data and the plurality of semantic tags that satisfy the one or more suitability criteria. Furthermore, the computer-implemented method can include generating, by the computing system, one or more indications including a description of the suitable location based at least in part on the one or more features associated with the suitable location.

Another example aspect of the present disclosure is directed to one or more tangible non-transitory computer-readable media storing computer-readable instructions that when executed by one or more processors cause the one or more processors to perform operations. The operations can include accessing location data and a plurality of semantic tags. The location data can include information associated with one or more interactions at one or more locations. Each semantic tag of the plurality of semantic tags can include information associated with a respective location of the one or more locations. Further, each semantic tag can be descriptive of one or more features associated with the respective location. The operations can also include identifying the location data and the plurality of semantic tags that satisfy one or more suitability criteria associated with suitability of each location for use by a geographic context application. The operations can include determining a suitable location of the one or more locations based at least in part on the location data and the plurality of semantic tags that satisfy the one or more suitability criteria. Furthermore, the operations can include generating one or more indications including a description of the suitable location based at least in part on the one or more features associated with the suitable location.

Another example aspect of the present disclosure is directed to a computing system including: one or more processors; and one or more non-transitory computer-readable media storing instructions that when executed by the one or more processors cause the one or more processors to perform operations. The operations can include accessing location data and a plurality of semantic tags. The location data can include information associated with one or more interactions at one or more locations. Each semantic tag of the plurality of semantic tags can include information associated with a respective location of the one or more locations. Further, each semantic tag can be descriptive of one or more features associated with the respective location. The operations can also include identifying the location data and the plurality of semantic tags that satisfy one or more suitability criteria associated with suitability of each location for use by a geographic context application. The operations can include determining a suitable location of the one or more locations based at least in part on the location data and the plurality of semantic tags that satisfy the one or more suitability criteria. Furthermore, the operations can include generating one or more indications including a description of the suitable location based at least in part on the one or more features associated with the suitable location.

Other aspects of the present disclosure are directed to various systems, apparatuses, non-transitory computer-readable media, user interfaces, and electronic devices. These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
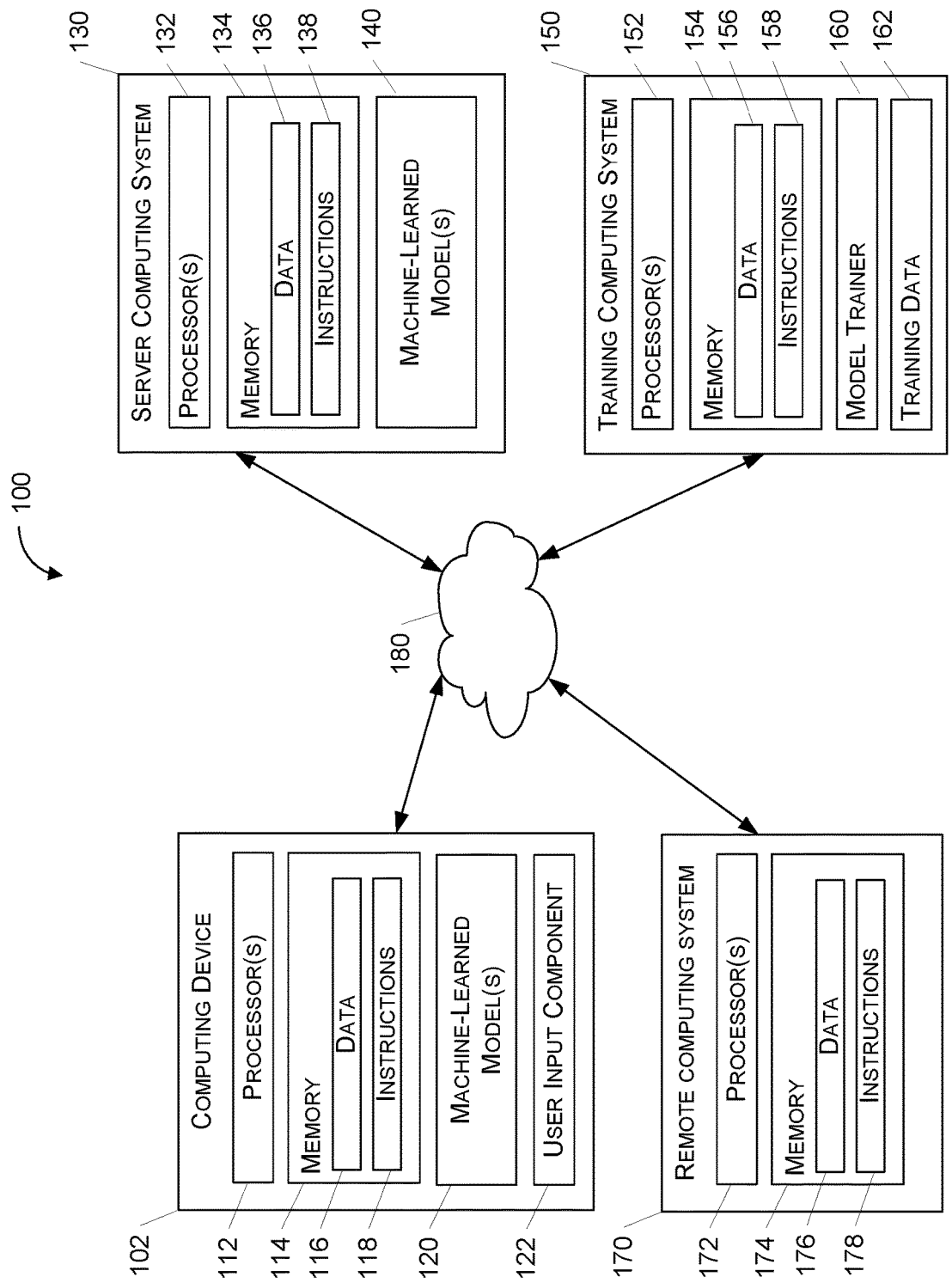
FIG. 1 depicts a diagram of an example system according to example embodiments of the present disclosure.

Reference numerals that are repeated across plural figures are intended to identify the same features in various implementations.

DETAILED DESCRIPTION

Generally, the present disclosure is directed to the determination of a location suitable for use by a geographic context application. Further, the present disclosure describes the generation of indications of a suitable location based on the satisfaction of suitability criteria associated with suitability of a location for use by a geographic context application. In particular, the disclosed technology can include a computing system that receives data including location data associated with interactions (e.g., pedestrian traffic) at geographic locations and semantic tags associated with descriptions of features (e.g., descriptions of objects) of the geographic areas. The location data can include maps of a geographic area and the locations of amenities. The semantic tags can be based on images that have been processed by a machine-learned model or other image content analysis system that detected and identified various features of the images. Further, the semantic tags can be associated with the geographic area including particular locations (e.g., latitude, longitude, and altitude) within the geographic area and other information (e.g., the time at which photographs of a location were captured).

The computing system can identify the location data and semantic tags that are associated with satisfying suitability criteria associated with a suitability of a location for use by a geographic context application. The computing system can then determine a location suitable for use by a geographic context application based on the location data and/or semantic tags that satisfy the suitability criteria associated with the suitability for use by a geographic context application (e.g., a safe, aesthetically appealing location that is not too far away from the user of the geographic context application). Furthermore, the computing system can generate indications including images of the suitable location, directions to the suitable location, and a description of the location that can be used to facilitate navigation to the suitable location. As such, the disclosed technology can more effectively determine a location suitable for use by a geographic context application. A geographic context application may be an application which performs one or more functions that are dependent upon a current geographic location of the device upon which the application executes. For example, a geographic context application may include one or more augmented reality functions in which use is made of the current physical environment of the device to perform one or more functions.

The disclosed technology may thus enable a geographic context application to interact more reliably and effectively with a physical environment. For example, by allowing the geographic context application to select appropriate locations for use, the technology may assist in the operation of the application. It may in particular ensure safety of operation, particularly in the context of a geographic context application which encourages interaction with the physical environment. Furthermore, the technology may enable users to more effectively and/or efficiently navigate to and identify a suitable location at which the users may use a geographic context application. In some examples, suitable locations may be referenced in a series of turn-by-turn navigational instructions which may be provided to a user who is travelling on foot. The described technology may thus assist the user in performing more effectively the technical task of navigating to a suitable location by means of a continued and/or guided human-machine interaction process.

By way of further example, a computing system (e.g., a computing system in a vehicle) operated by a user desiring a suitable location to enjoy an augmented reality game can be used to determine the suitable location. The data can include location data (e.g., maps of an area including the user and nearby locations including commercial areas, parks, and recreation areas) and semantic tags that indicate features of locations in the geographic area that were previously identified using image recognition (e.g., a machine-learned model trained to detect features present in images of a location). The computing system can then determine a location that is suitable for use by the geographic context application. For example, the computing system can determine a suitable location that is safe (e.g., in a park and far away from vehicular traffic), aesthetically appealing (e.g., a location with a fountain), and within convenient walking distance of the user (e.g., within five hundred meters of the user). The computing system can then provide a set of instructions (e.g., audible directions generated through a smart phone of the user and/or textual or graphical instructions provided on a display of the user's smartphone) and a description of the suitable location to the user to assist in navigation to the location. As such, the disclosed technology provides a variety of improvements in navigation and determination of a location suitable for use by a geographic context application.

Finding locations for the placement of characters (e.g., gaming characters) and/or art (e.g., background art) in geographic context applications (e.g., augmented reality games) can require rich knowledge of various mapped and unmapped semantic features and attributes. One approach to determining these locations is to use more recent and granular information drawn from various sources including data about pedestrian traffic that can be obtained by aggregating in a privacy enhancing manner, user locations (e.g., user locations based on mobile device usage including the usage of smart phones). A second approach is to use the locations where publicly accessible photos on the Internet were captured (e.g., photographs that have location information associated with them) or photographs captured by users of geographic context applications (e.g., augmented reality games) who volunteered to anonymously collect such locations for the geographic context applications. A third approach is to use locations associated with image content analysis and semantic tags obtained from a large street-level imagery corpus.

The benefits and utility of each of the data sources used in the above three approaches can be evaluated in the context of knowledge categories including safety; commercial potential and/or capacity; aesthetic score; and pedestrian convenience and "dwell-ability" (the ability for an individual to stay in one location for more than a few moments). Pedestrian traffic data can be used to address any of these knowledge categories.

In some embodiments, the pedestrian traffic data is received at regular time intervals and can have a threshold applied based on the speed of the pedestrian traffic (e.g., traffic moving at a speed above a speed threshold is not considered to be pedestrian traffic). Further, the pedestrian traffic data can be processed into cell-based scores, which are not necessarily equal to the actual number of pedestrians but can be indicative of pedestrian presence. Further, a geographic area can be represented by a grid of cells at a predetermined resolution (e.g., squares of two meters per side). Additionally, a determination can be made that a large amount of pedestrian traffic corresponds to an area that is more safe for people (e.g., the pedestrians are at a reduced risk of a harmful event occurring). Further, large numbers of pedestrians can be useful indicators of commercial public areas including shopping malls and/or sidewalks. Also, in areas where there are many pedestrians there can be a correspondingly large number of facilities to accommodate them (e.g., benches, bus/shuttle shelters, and/or bathrooms).

Another data source includes the locations of publicly accessible images (e.g., images available on the Internet). In some embodiments, geolocation metadata of images (e.g., publicly available images) can be used as a central data source. This geolocation metadata can be further processed into aggregated cell-based scores indicative of the amount of photographs captured within a cell. This photograph capture score (e.g., a photograph capture score denoted as "A" for aesthetics) can be a measure of any combination of the knowledge categories including safety; commercial potential and/or capacity; aesthetic score; and pedestrian convenience and "dwell-ability" of a location. In some embodiments, the photograph capture score can correspond most closely to the aesthetic score and the pedestrian convenience and dwell-ability since the locations where people take photos may tend to score higher in terms of aesthetics and provide enough convenience to enable people to remain at the location for longer than a few moments.

An additional data source is the output of an image content analysis system on a large street-level imagery corpus. Image content analysis systems can analyze the semantic content of an image and provide a detailed description of the entities found in the form of semantic tags. The number of semantic tags can be numerous (e.g., thousands of semantic tags), thus such systems can have a very broad scope in terms of the content they can describe. These image content analysis systems can be used to process vast collections of imagery so that a street-level corpus can be analyzed and certain specific semantic tags may be used to characterize locations.

In order to reduce noise in the image content analysis responses and take advantage of the density of street level imagery (e.g., street level imagery that is based on multiple runs per street including multiple close-up images in each run), the number of detections can be thresholded for a specific semantic tag that is of interest. Further, the image time associated with each semantic tag can be recorded so that priority can be given to the latest detections. The semantic tags of interest can be numerous, but a subset of these semantic tags can be determined based on the knowledge categories.

In some embodiments, the individual cell-based scores (e.g., pedestrian traffic scores, photo-taking, and one for each semantic tag of interest) can be combined into a single formula for each of the knowledge categories, with specific weights that can be determined experimentally and/or based on human curation. For example, an aesthetics score can be expressed as: Aesthetics=$w\_1*P+w\_2*A+w\_3*ICA\_tag\_1+w\_[n+2]*ICA\_tag\_n$, in which w denotes a weight, P represents pedestrian presence (e.g., pedestrian presence based in part on pedestrian traffic in an area), A represents a photograph capture score (e.g., a photograph capture score based in part on an amount of photographs captured in an area), and the ICA_tag represents a semantic tag (e.g., a semantic tag generated by an image content analysis system) that is associated with some feature in location. Further, other functions can be used to determine other knowledge categories including safety, commercial potential/capacity, and/or pedestrian convenience.

In turn, the combination of these functions for the individual knowledge categories can then become components of an overall suitability function for a geographic context application (e.g., an augmented reality game). The weights for each of these components can be determined based on the application, type of application, user profile, and/or user preferences so that preference can be given to any of the knowledge categories including safety, commercial potential and/or capacity, aesthetic score, and pedestrian convenience and "dwell-ability" of a location.

Furthermore, safety can be evaluated separately and used for thresholded filtering, so that locations that do not satisfy the safety criteria (e.g., satisfaction of the safety criteria being associated with lower risk) are not used. The results of the evaluation of such an overall suitability function can be used to rank the nearby cells (e.g., cells restricted to within a predetermined distance of a query point including a user location) and the elements of the geographic context application can then be placed in the top scoring cells corresponding by rank to the importance of each element.

Figure 2:
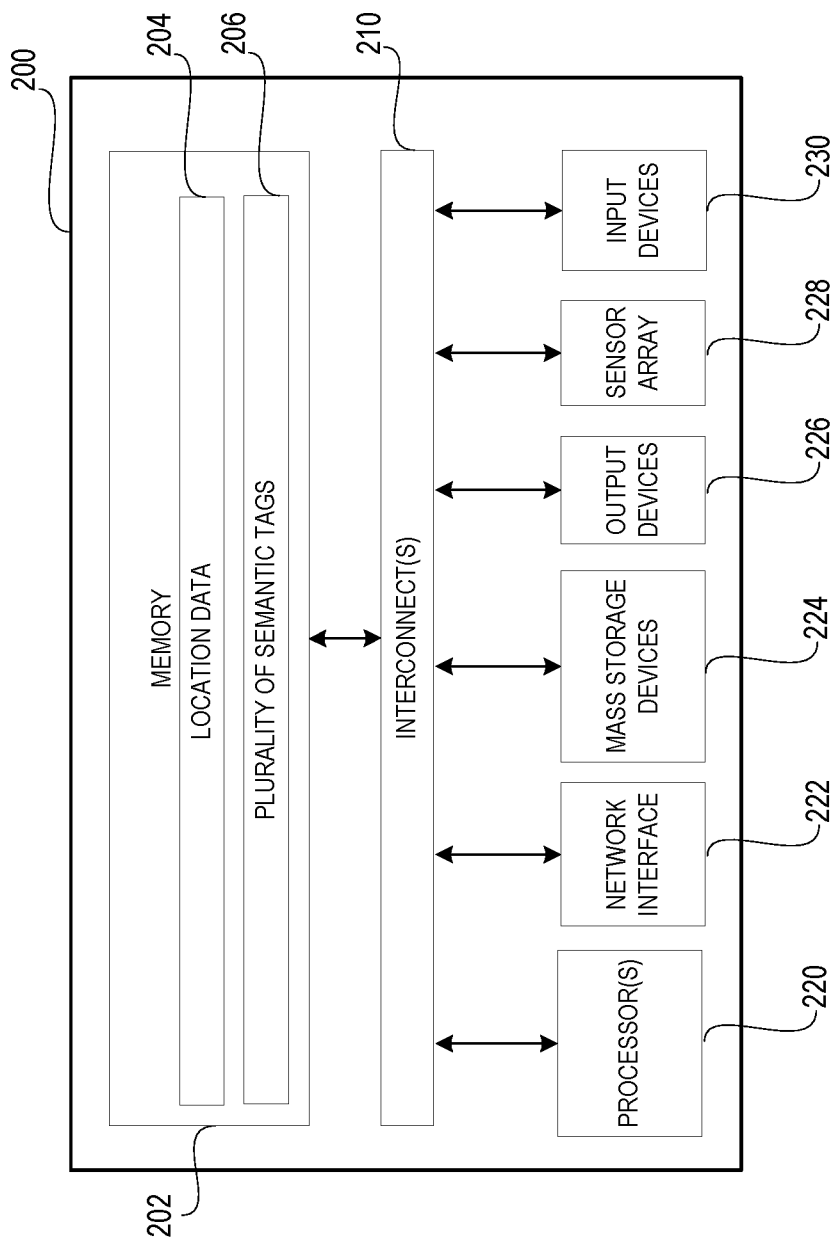
FIG. 2 depicts a diagram of an example device according to example embodiments of the present disclosure.

In some embodiments, the disclosed technology can include a computing system (e.g., a geographic computing system) that can include one or more computing devices (e.g., devices with one or more computer processors and a memory that can store one or more instructions) that can send, receive, process, generate, and/or modify data (e.g., data including location data associated with one or more locations and semantic tags associated with images) including one or more information patterns or structures that can be stored on one or more memory devices (e.g., one or more random access memory devices) and/or one or more storage devices (e.g., one or more hard disk drives and/or one or more solid state memory drives); and/or one or more signals (e.g., electronic signals). The data and/or one or more signals can be exchanged by the computing system with various other systems and/or devices including a plurality of service systems (e.g., one or more remote computing systems, one or more remote computing devices, and/or one or more software applications operating on one or more computing devices) that can send and/or receive data including location data and semantic tags associated with images (e.g., digital images associated with data including geographic location, time of image capture, and/or one or more descriptions of one or more other features of the images). In some embodiments, the computing system (e.g., the geographic computing system) can include one or more features of the device 102 that is depicted in FIG. 1 and/or the computing device 200 that is depicted in FIG. 2. Further, the network computing system can be associated with one or more machine-learned models that include one or more features of the one or more machine-learned models 120 that are depicted in FIG. 1

Furthermore, the computing system can include specialized hardware (e.g., an application specific integrated circuit) and/or software that enables the computing system to perform one or more operations specific to the disclosed technology including accessing location data (e.g., location data including one or more maps of an area), semantic tags (e.g., accessing locally stored semantic tags and/or accessing semantic tags by receiving the semantic tags from a remote computing device) associated with a plurality of images, determining locations that are suitable for use by geographic context applications, and generating descriptions (e.g. textual descriptions and/or audible natural language descriptions) of the locations that are suitable for use by geographic context applications.

The geographic computing system can access location data and a plurality of semantic tags. The location data can include information associated with one or more interactions at one or more locations. The plurality of semantic tags can include information associated with a plurality of images of the one or more locations. Further, each semantic tag of the plurality of semantic tags can include information associated with one or more features depicted by the plurality of images of the one or more locations.

In some embodiments, the location data can include information associated with one or more interactions (e.g., interactions by one or more people) at the one or more locations including a number of photographs captured at each of the one or more locations, a number of pedestrians that pass through each of the one or more locations, the locations of amenities (e.g., seats and/or lavatories) at each of the one or more locations, and/or the location of attractions at each of the one or more locations (e.g., the location of restaurants, shopping areas, and/or places of entertainment).

Further, the location data can include information associated with one or more maps which can indicate the location of roads (e.g., streets, highways, and/or alleyways), buildings, bodies of water, waterways, bridges, tunnels, overpasses, and/or underpasses. The location data can also include information associated with traffic regulations (e.g., speed limits in a location, the locations of traffic lights, and/or the locations of stop signs), traffic flow patterns (e.g., the direction and/or amount of vehicular traffic in an area), and/or the locations of one or more hazards including construction zones.

In some embodiments, each semantic tag of the plurality of semantic tags and/or the location data can be associated with information including: a location (e.g., a street address and/or an altitude, latitude, and longitude) which can be associated with the one or more locations; a time of day (e.g., a time of day when a semantic tag was generated, modified, and/or most recently accessed) which can be associated with the one or more locations; and/or a date (e.g., a date when a semantic tag was generated, modified, and/or most recently accessed) which can be associated with the one or more locations.

In some embodiments, each semantic tag of the plurality of semantic tags can be descriptive of one or more features (e.g., one or more features of a location of the one or more locations) which can be associated with the one or more locations. For example, each semantic tag of the plurality of semantic tags can include information associated with one or more features including: physical dimensions (e.g., physical dimensions of one or more objects at a location); and/or object identities (e.g., the identity of objects at each location). Furthermore, the one or more features of the one or more locations can include one or more features of: objects in each location of the one or more locations including buildings, utility poles, trees, mail boxes, benches, and/or garbage cans; one or more surfaces of each location of the one or more locations (e.g., paved roads, lawns, and/or bodies of water); traffic signage (e.g., traffic signs and/or traffic indications on roads); and/or light source features including the location of street lights.

In some embodiments, each semantic tag of the plurality of semantic tags can be associated with one or more features depicted by an image of the plurality of images. For example, each semantic tag can provide one or more semantic descriptions of one or more objects included within a scene depicted by one of the plurality of images. The plurality of images can include one or more digital images (e.g., a two dimensional image) of a portion of an environment (e.g., an image of a portion of a location of the one or more locations). Further, the plurality of images can be encoded in any type of image format including a combination of raster images (e.g., bitmaps comprising an array of pixels) and/or vector images (e.g., polygonal representations of images based on positions of coordinates including x and y axes of a two-dimensional plane). The images can include still images, image frames from a movie, and/or other types of imagery including LIDAR imagery, and/or RADAR imagery.

Examples of digital image formats used by the plurality of images can include JPEG (Joint Photographic Experts Group), BMP (Bitmap), TIFF (Tagged Image File Format), PNG (Portable Network Graphics), and/or GIF (Graphics Interchange Format). The images can be collected from various sources including user-submitted imagery, imagery in the public domain (e.g., anonymized imagery obtained via web crawl), and/or street-level panoramic imagery.

By way of example, the geographic computing system can receive data including information associated with the location data and/or the plurality of semantic tags via a communication network (e.g., a wireless and/or wired network including a LAN, WAN, or the Internet) through which one or more signals (e.g., electronic signals) and/or data can be sent and/or received. By way of further example, the geographic computing system can receive data including a plurality of semantic tags from one or more remote image repositories which include images that include embedded semantic tags identifying one or more features of the images.

The geographic computing system can identify the location data and/or the plurality of semantic tags that satisfy one or more suitability criteria. For example, the geographic computing system can access data and/or information associated with the location data and/or the plurality of semantic tags. The plurality of semantic tags can include information associated with one or more features of a location of the one or more locations. Further, the plurality of semantic tags can be used to determine whether a location satisfies one or more suitability criteria. The one or more suitability criteria can be associated with the suitability of a location for use by a geographic context application. Further, the location data and/or each semantic tag of the plurality of semantic tags can be compared to each of the one or more suitability criteria that can be used to determine a location that is suitable for use by a geographic context application (e.g., an augmented reality game).

The geographic computing system can determine a suitable location of the one or more locations based at least in part on the location data and the plurality of semantic tags that satisfy the one or more suitability criteria. By way of example, the suitable location can be determined based at least in part on various aspects or factors of suitability including: the safety of a location (e.g., locations that are further away from large volumes of vehicular traffic); the capacity of a location (e.g., the size and/or capacity of a location to accommodate people); the aesthetic appeal of a location (e.g., the attractiveness of a location which can be based at least in part on the number of aesthetically appealing features in comparison to the number of aesthetically unappealing features); the convenience of a location (e.g., the convenience of a location in terms of accessibility to a pedestrian and the extent to which the location can be used by a person for an extended period of time). Furthermore, the suitability of a location can be associated with one or more other characteristics of the location including the distinctiveness of one or more features at a location (e.g., the unusualness of the one or more features of a location); and/or the rarity or uncommonness of one or more features of the location.

By way of further example, determination of a suitable location can be based, for example, on features of a location satisfying one or more safety criteria. As such, in one example, information (e.g., the absence of hazards) associated with a location can be used to determine that a location satisfies one or more safety criteria associated with the safety of an area. By way of further example, satisfaction of the one or more suitability criteria can be based, for example, on a location satisfying one or more capacity criteria. Thus, in one example, information (e.g., the size of an area) associated with a location can be used to determine that a location satisfies one or more capacity criteria associated with the capacity of an area. By way of further example, satisfaction of the one or more suitability criteria can be, based, for example, on a location satisfying one or more aesthetic criteria associated with the aesthetic appeal of a location (e.g., aesthetic appeal as determined based in part on the number of aesthetically appealing features at the location). By way of further example, satisfaction of the one or more suitability criteria can be based, for example, on features of a location satisfying one or more convenience criteria. By way of example, information (e.g., the amount of foot traffic through an area) associated with a location can be used to determine that a location satisfies one or more convenience criteria associated with the convenience of an area.

In some embodiments, the geographic context application can include an augmented reality application (e.g., an augmented reality game), a photography application (e.g., an application used to select locations at which to capture photographs), and/or a mapping application (e.g., an application used to assist in navigation of an area).

The geographic computing system can generate one or more indications which can include a description of the suitable location based at least in part on the one or more features associated with the suitable location.

In some embodiments, the one or more indications can include one or more images of the one or more locations (e.g., one or more photographs of a location), a map including the one or more locations and the one or more locations (e.g., a map with the one or more locations highlighted), one or more textual descriptions of the one or more locations (e.g., one or more natural language sentences describing the one or more locations), and/or one or more auditory descriptions of the one or more locations.

The geographic computing system can determine a safety level of each location of the one or more locations based at least in part on the location data and/or the plurality of semantic tags. For example, the geographic computing system can determine a safety level of a location based at least in part on the location data that indicates the amount of vehicular traffic passing through a location. By way of further example, the geographic computing system can determine the safety level of each location of the one or more locations based at least in part on the plurality of semantic tags that indicate street lights, bus stops, and/or shops.

Further, the geographic computing system can determine that the safety level of the suitable location satisfies one or more safety criteria. For example, the geographic computing system can determine that the safety level of a location with no vehicular traffic (e.g., the center of a park) satisfies the one or more safety criteria, whereas a location with abundant, high-speed, vehicular traffic (e.g., the middle of a highway) does not satisfy the one or more safety criteria.

In some embodiments, the geographic computing system can determine that a location is suitable based at least in part on determining that the safety level of the one or more locations satisfies one or more safety criteria.

In some embodiments, determining that the safety level of the one or more locations satisfies one or more safety criteria can include: determining that a location of the one or more locations exceeds a minimum distance (e.g., a minimum distance in meters) to a road; determining that a location of the one or more locations exceeds a minimum distance to a predefined elevation change boundary; determining that an amount of pedestrian traffic (e.g., a number of pedestrians in an area per minute) within a predetermined distance of a location of the one or more locations exceeds a pedestrian traffic threshold (e.g., the number of pedestrians per minute exceeding a pedestrians per minute threshold).

In some embodiments, the geographic computing system can determine, based at least in part on the location data, one or more paths from an initial location (e.g., the location of a user of a geographic context application) to the one or more locations. For example, the geographic computing system can access map information in the location data to determine one or more paths from the initial location of a user of a geographic context application to the one or more locations.

Further, the geographic computing system can determine a path safety level of each path of the one or more paths based at least in part on the one or more features associated with each location of the one or more locations within a predetermined distance of the one or more paths. For example, the geographic computing system can determine a path safety level of a location based at least in part on the one or more features associated with a hazard that occur within twenty meters of a path to the location.

Further, the geographic computing system can determine that the suitable location is associated with at least one path of the one or more paths that satisfy one or more path safety criteria which can be associated with increased safety of travel from the initial location to the one or more locations. For example, the geographic computing system can determine that the one or more path safety criteria for the one or more locations associated with the at least one path are satisfied when the path to the one or more locations does not pass through a hazard (e.g., a construction zone).

Further, the geographic computing system can generate one or more indications including navigational instructions from the initial location to the suitable location associated with the at least one path of the one or more paths that satisfy the one or more path safety criteria. For example, the geographic computing system can generate directions directing a user of a geographic context application from an initial location to the suitable location associated with the at least one path of the one or more paths that satisfy the one or more safety criteria.

The geographic computing system can determine a capacity of each location of the one or more locations based at least in part on the location data and/or the plurality of semantic tags associated with each location of the one or more locations. For example, the geographic computing system can determine a capacity based at least in part on the plurality of semantic tags associated with the area (e.g., an area in square meters) of a location.

Further, the geographic computing system can determine that the capacity of the suitable location satisfies one or more capacity criteria. For example, the geographic computing system can determine that the suitable location satisfies the one or more capacity criteria when the area of the suitable location exceeds a capacity threshold (e.g., the area is greater than thirty square meters).

In some embodiments, the geographic computing system determining the suitable location can include determining that the capacity of the suitable location satisfies one or more capacity criteria.

In some embodiments, determining that the capacity of the suitable location satisfies one or more capacity criteria can include determining that a location of the one or more locations exceeds a minimum physical area (e.g., a minimum area in square meters) or determining that a location of the one or more locations exceeds a minimum pedestrian capacity (e.g., a minimum number of pedestrians permitted in an area).

The geographic computing system can determine a photographic aesthetic score for each location of the one or more locations based at least in part on the plurality of semantic tags. The photographic aesthetic score can be associated with a number of photographs captured (e.g., a total number of photographs captured at a location) at each of the one or more locations location and/or a rate of photographs captured at each of the one or more locations (e.g. an average number of photographs captured each week). For example, the geographic computing system can access data associated with the plurality of semantic tags to determine how many photographs were captured at a location in a particular time period (e.g., the past year). By way of further example, a more frequently photographed location may be determined to be more aesthetically pleasing than a less photographed location. In some implementations, the geographic computing system can access data (e.g., data stored at one or more image databases) associated with a frequency and/or number of photographs taken at a particular location.

Further, the geographic computing system can determine that the photographic aesthetic score of the suitable location satisfies one or more photographic aesthetic criteria. For example, the geographic computing system can compare the photographic aesthetic score to a threshold photographic aesthetic score in order to determine that the location with a photographic aesthetic score exceeds the threshold photographic aesthetic score and thereby satisfies the one or more photographic aesthetic criteria.

In some embodiments, the geographic computing system can determine a suitable location based at least in part on determining that the photographic aesthetic score of the suitable location satisfies one or more photographic aesthetic criteria.

The geographic computing system can determine, for each respective location of the one or more locations, whether any semantic tag of the plurality of semantic tags associated with the respective location satisfies one or more aesthetic criteria. For example, the geographic computing system can determine whether a semantic tag associated with a location satisfies the one or more aesthetic criteria including a semantic tag that has received positive feedback that corresponds to aesthetic appeal (e.g., written feedback indicating that a location is aesthetically appealing and/or beautiful).

Further, the geographic computing system can determine that the suitable location is associated with at least one semantic tag that satisfies the one or more aesthetic criteria. For example, the geographic computing system can determine based on an evaluation of the plurality of semantic tags that the suitable location is associated with a semantic tag that is associated with positive feedback extolling the aesthetic appeal of a location.

In some embodiments, the geographic computing system determining a suitable location can include determining that the suitable location is associated with at least one semantic tag (e.g., a semantic tag indicating the presence of an aesthetically appealing feature which can include a sculpture and/or fountain) that satisfies the one or more aesthetic criteria.

In some embodiments, the geographic computing system can determine, based at least in part on the location data and the plurality of semantic tags, which of the one or more features associated with each location of the one or more locations are visible. For example, the geographic computing system can use the location data (e.g., location data that can be used to determine distances between locations) and the plurality of semantic tags at locations within a predetermined distance of a particular location to determine the presence of various features (e.g., objects including trees, buildings, benches, and/or playgrounds) that are visible at the particular location.

Further, the geographic computing system can determine that any visible features associated with the suitable location are not aesthetically unappealing. For example, the geographic computing system can determine that the suitable location does not include aesthetically unappealing features (e.g., garbage piles, construction sites, and/or scrap yards) that are visible.

In some embodiments, the geographic computing system determining the suitable location can include determining that the one or more features that are aesthetically unappealing are not visible from the one or more locations.

In some embodiments, the geographic computing system can determine a convenience of each location of the one or more locations based at least in part on the location data associated with each location of the one or more locations. For example, the geographic computing system can access the location data to determine the convenience of a location based at least in part on an amount of pedestrian traffic through a location and the commercial use of the location (e.g., determining whether the location is a playground or a restaurant).

Further, the geographic computing system can determine that the convenience of the one or more locations satisfies one or more convenience criteria. For example, the geographic computing system can determine that a location with a playground and pedestrian traffic within a specified range satisfies one or more convenience criteria.

In some embodiments, the geographic computing system can determine that a location is suitable based at least in part on determining that the convenience of the one or more locations satisfies one or more convenience criteria.

In some embodiments, determining that the convenience of the one or more locations satisfies one or more convenience criteria can include determining that a number of amenities (e.g., seats and/or lavatories) at a location of the one or more locations exceeds a number of amenities threshold or determining that an amount of pedestrian traffic (e.g., a rate of pedestrians per minute that pass through an area) at a location of the one or more locations is less than a pedestrian traffic threshold.

The geographic computing system can determine a suitability score for each of the one or more geographic areas (e.g., geographic areas of a predetermined size) based at least in part on an amount of the one or more features that satisfy the one or more suitability criteria within each of the plurality of areas. For example, the geographic computing system can determine the suitability score for each of the plurality of areas by counting the number of the one or more features (e.g., fountains, trees, and/or murals) in each area that satisfy the one or more suitability criteria associated with aesthetically appealing features and subtracting the number of the one or more features that are aesthetically unappealing (e.g., garbage piles and construction zones).

Further, the geographic computing system can determine that the suitable location is within a geographic area with a suitability score that satisfies one or more suitability criteria (e.g., a suitability score that exceeds a suitability score threshold). For example, the geographic computing system can determine that the suitable location is within the area with the highest suitability score.

In some embodiments, the geographic computing system can determine that a location is suitable based at least in part on determining that the one or more locations is within an area of the one or more geographic areas with the suitability score that is greatest or exceeds a suitability score threshold.

In some embodiments, the geographic computing system can determine a type of the geographic context application. For example, the geographic computing system can determine that the geographic context application is an augmented reality game.

Further, the geographic computing system can determine or adjust a weighting of the one or more suitability criteria based at least in part on the type of the geographic context application. For example, the geographic computing system can determine the weight the one or more suitability criteria associated with aesthetics (e.g., one or more aesthetic criteria) when the geographic context application is a photography application (e.g., an application that is used to select aesthetically appealing locations at which to capture photographs).

The geographic computing system can determine, based at least in part on the location data, an amount of network connectivity at each of the one or more locations. For example, the geographic computing system can access location data including the locations of cellular towers and wireless hotspots in an area to determine the amount of network connectivity at a location and further to determine that the network connectivity satisfies one or more network connectivity criteria by exceeding an available network bandwidth threshold associated with the number of cellular towers and wireless hotspots.

Further, the geographic computing system can determine that the amount of network connectivity at the one or more locations satisfies one or more network connectivity criteria (e.g., exceeds a network connectivity threshold associated with an amount of available network bandwidth). For example, the geographic computing system can determine that the amount of network connectivity at the one or more locations exceeds an amount of network connectivity necessary to operate a particular geographic context application (e.g., the network connectivity allows a minimum amount of network bandwidth to operate the geographic context application).

In some embodiments, the geographic computing system can determine that a location is suitable based at least in part on determining that the amount of network connectivity at the one or more locations satisfies one or more network connectivity criteria.

The geographic computing system can determine a ranking of the one or more locations based at least in part on a proportion of the one or more suitability criteria that are satisfied at each location of the one or more locations. For example, the geographic computing system can rank a location that satisfies six of the suitability criteria higher than a location that satisfies five or fewer of the suitability criteria.

Further, the geographic computing system can generate one or more indications including a portion of the one or more locations arranged based at least in part on the ranking of the one or more locations. For example, the geographic computing system can generate one or more audible indications (e.g., audibly announce the names of the one or more locations in the order of the ranking of the one or more locations).

Further, the geographic computing system can receive an input to select a location of the one or more locations. For example, the geographic computing system can include a microphone through which the geographic computing system can receive spoken input to select a location of the one or more locations (e.g., "I will go to the first location in the list").

In some embodiments, the geographic computing system can determine, for each location of the one or more locations, a crowd density based at least in part on an amount of people at each location of the one or more locations. For example, the geographic computing system can access location data and/or the plurality of semantic tags to determine crowd density based at least in part on the area (e.g., the area in square meters) and the number of people at each location of the one or more locations.

Further, the geographic computing system can determine that the crowd density of the suitable location is within a crowd density range. The geographic computing system can compare the crowd density to the crowd density range to determine when the crowd density is within the crowd density range. The crowd density range can be used to exclude the one or more locations with a density that is less than (e.g., the number of people is too sparse) or greater than (e.g., the number of people is too crowded) the crowd density range.

In some embodiments, the geographic computing system can determine that a location is suitable based at least in part on determining that the crowd density of the one or more locations is within a crowd density range.

The systems, methods, devices, apparatuses, and tangible non-transitory computer-readable media in the disclosed technology can provide a variety of technical effects and benefits including an improvement in determination of a location for use by a geographic context application. In particular, the disclosed technology may assist the user (e.g. a user of an augmented reality game) in performing a technical task (e.g. selecting a specified location at which to use the augmented reality game) by means of a continued and/or guided human-machine interaction process. It may also provide benefits including improvements in the performance of communications networks, better resource usage efficiency, and improved safety.

The disclosed technology can improve the performance of communications network operation by more effectively determining a location suitable for use in a geographic context application. The suitable location can then be provided to more efficiently direct users to locations with sufficient network connectivity and network bandwidth and avoid situations in which network connectivity is overly stressed or insufficient to operate a geographic context application. As such, more effective determination of a suitable location can result in greater availability of network connectivity and more effective bandwidth utilization.

Furthermore, the disclosed technology can improve the efficiency of resource consumption (e.g., fuel and electrical energy) by directing users to locations that have available capacity and thereby preventing overcrowding. For example, a user of a geographic context application can be directed to a location that has a modest usage of capacity, thereby offering benefits in the use of network and other resources that are diminished at more crowded locations.

Accordingly, the disclosed technology may assist the user of a geographic context application to perform more efficiently/effectively the technical task of navigating to a specified location by means of a continued and/or guided human-machine interaction process. In addition, the disclosed technology may provide a computing system that facilitates more effective determination of a location for use by a geographic context application. The disclosed technology provides the specific benefits of reduced network bandwidth utilization, and more efficient fuel and energy usage, any of which can be used to improve the effectiveness of a wide variety of services including navigation services and/or geographic context application services.

With reference now to FIGS. 1-15, example embodiments of the present disclosure will be discussed in further detail. FIG. 1 depicts a diagram of an example system according to example embodiments of the present disclosure. The system 100 includes a computing device 102, a server computing system 130, a training computing system 150, and one or more remote computing systems 170 that are communicatively connected and/or coupled over a network 180.

The computing device 102 can include any type of computing device, including, for example, a personal computing device (e.g., laptop computing device or desktop computing device), a mobile computing device (e.g., smartphone or tablet), a gaming console, a controller, a wearable computing device (e.g., a smart watch), an embedded computing device, and/or any other type of computing device.

The computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, including RAM, ROM, EEPROM, EPROM, flash memory devices, magnetic disks, etc., and combinations thereof. The memory 114 can store data 116 and instructions 118 which are executed by the processor 112 to cause the computing device 102 to perform operations.

In some embodiments, the computing device 102 can perform one or more operations including accessing location data (e.g., data associated with one or more pedestrian interactions at a geographic location, one or more vehicular interactions at a geographic location, one or more maps, geographic locations, and/or geographic areas); and/or semantic data including a plurality of semantic tags that can be associated with one or more features of one or more respective geographic locations which may be depicted in one or more images. Further, each semantic tag can be descriptive of one or more features associated with the respective location. The operations performed by the computing device 102 can also include identifying the location data and the plurality of semantic tags that satisfy one or more suitability criteria associated with suitability of each location for use by a geographic context application. The operations performed by the computing device 102 can include determining a suitable location of the one or more locations based at least in part on the location data and the plurality of semantic tags that satisfy the one or more suitability criteria. Furthermore, the operations performed by the computing device 102 can include generating one or more indications including a description of the suitable location based at least in part on the one or more features associated with the suitable location.

In some implementations, the computing device 102 can store or include one or more machine-learned models 120. For example, the one or more machine-learned models 120 can include various machine-learned models including neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Examples of the one or more machine-learned models 120 are discussed with reference to FIGS. 1-15.

In some implementations, the one or more machine-learned models 120 can be received from the server computing system 130 over network 180, stored in the computing device memory 114, and then used or otherwise implemented by the one or more processors 112. In some implementations, the computing device 102 can implement multiple parallel instances of a single machine-learned model of the one or more machine learned models 120 (e.g., to perform parallel suitable location determination across multiple instances of the machine-learned model 120). More particularly, the one or more machine-learned models 120 can determine and/or identify locations suitable for use by a geographic context application based in part on various inputs including location data and/or semantic tags (e.g., semantic tags associated with one or more features of a location). Further, the one or more machine learned models 120 can determine one or more indications to provide in association with suitable locations that are identified.

Additionally or alternatively, one or more machine-learned models 140 can be included in or otherwise stored and implemented by the server computing system 130 that communicates with the computing device 102 according to a client-server relationship. For example, the machine-learned models 140 can be implemented by the server computing system 140 as a portion of a web service (e.g., a suitable location determination service). Thus, one or more machine-learned models 120 can be stored and implemented at the computing device 102 and/or one or more machine-learned models 140 can be stored and implemented at the server computing system 130.

The computing device 102 can also include one or more of the user input component 122 that can receive user input. For example, the user input component 122 can be a touch-sensitive component (e.g., a touch-sensitive display screen or a touch pad) that is sensitive to the touch of a user input (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can include any suitable processing device (e.g., a processor core, a microprocessor, an ASIC, a FPGA, a controller, a microcontroller, etc.) and can include one processor or a plurality of processors that are operatively connected. The memory 134 can include one or more non-transitory computer-readable storage mediums, including RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some embodiments, the server computing system 130 can perform one or more operations including accessing location data and a plurality of semantic tags. The location data can include information associated with one or more interactions at one or more locations. Each semantic tag of the plurality of semantic tags can include information associated with a respective location of the one or more locations. Further, each semantic tag can be descriptive of one or more features associated with the respective location. The operations performed by the server computing system 130 can also include identifying the location data and the plurality of semantic tags that satisfy one or more suitability criteria associated with suitability of each location for use by a geographic context application. The operations performed by the server computing system 130 can include determining a suitable location of the one or more locations based at least in part on the location data and the plurality of semantic tags that satisfy the one or more suitability criteria. Furthermore, the operations performed by the server computing system 130 can include generating one or more indications including a description of the suitable location based at least in part on the one or more features associated with the suitable location.

Furthermore, the server computing system 130 can perform image content analysis on one or more inputs (e.g., one or more images) that are provided to the server computing system 130. For example, the server computing system 130 can receive data, via the network 180, including one or more images and/or associated semantic tags. The server computing system 130 can then perform various operations, which can include the use of the one or more machine-learned models 140, to detect one or more features of the one or more images and/or to associated semantic tags with images. By way of further example, the server computing system 130 can use object recognition techniques to detect one or more objects in an image (e.g., detecting pedestrians, vehicles, various buildings, fountains, street signs, and road markings) and generate semantic information based on recognition of the objects. In another example, the server computing system 130 can receive data from one or more remote computing systems (e.g., the one or more remote computing systems 170) which can include images that have been associated with semantic tags (e.g., images with manual user associated semantic tags and/or images with semantic tags generated by a user device). The data received by the server computing system 130 can then be stored (e.g., stored in an image repository) for later use by the computing system 130.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the one or more machine-learned models 140 can include various machine-learned models. Example machine-learned models include neural networks or other multi-layer non-linear models. Example neural networks include feed forward neural networks, deep neural networks, recurrent neural networks, and convolutional neural networks. Examples of the one or more machine-learned models 140 are discussed with reference to FIGS. 1-15.

The computing device 102 and/or the server computing system 130 can train the one or more machine-learned models 120 and/or 140 via interaction with the training computing system 150 that is communicatively connected and/or coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, including RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned one or more machine-learned models 120 and/or the one or more machine-learned models 140 respectively stored at the computing device 102 and/or the server computing system 130 using various training or learning techniques, including, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the one or more machine-learned models 120 and/or the one or more machine-learned models 140 based on a set of training data 162. The training data 162 can include, for example, location data (e.g., data including information associated with pedestrian and vehicle interactions in a location), semantic data (e.g., semantic tags) describing the location and/or one or more features in an area. For example, the training data can include physical dimensions associated with a feature, the proximity of a feature to one or more points of reference (e.g., other locations), the location of a feature (e.g., latitude, longitude, and/or altitude of a feature), and/or various metadata associated with the feature (e.g., a nickname for a feature, a former name of a feature, and/or alternate spellings of a feature).

In some implementations, if the user has provided consent, the training examples can be provided by the computing device 102. Thus, in such implementations, the one or more machine-learned models 120 provided to the computing device 102 can be trained by the training computing system 150 on user-specific data received from the computing device 102. In some instances, this process can be referred to as personalizing the model.

The model trainer 160 can include computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium including RAM hard disk or optical or magnetic media.

In some embodiments, the training computing system 150 can perform one or more operations including accessing location data and a plurality of semantic tags. The location data can include information associated with one or more interactions at one or more locations. Each semantic tag of the plurality of semantic tags can include information associated with a respective location of the one or more locations. Further, each semantic tag can be descriptive of one or more features associated with the respective location. The operations performed by the training computing system 150 can also include identifying the location data and the plurality of semantic tags that satisfy one or more suitability criteria associated with suitability of each location for use by a geographic context application. The operations performed by the training computing system 150 can include determining a suitable location of the one or more locations based at least in part on the location data and the plurality of semantic tags that satisfy the one or more suitability criteria. Furthermore, the operations performed by the training computing system 150 can include generating one or more indications including a description of the suitable location based at least in part on the one or more features associated with the suitable location.

Each of the one or more remote computing systems 170 includes one or more processors 172 and a memory 174. The one or more processors 172 can include any suitable processing device (e.g., a processor core, a microprocessor, an ASIC, a FPGA, a controller, a microcontroller, etc.) and can include one processor or a plurality of processors that are operatively connected. The memory 174 can include one or more non-transitory computer-readable storage mediums, including RAM, ROM, EEPROM, EPROM, flash memory devices, magnetic disks, etc., and combinations thereof. The memory 174 can store data 176 and instructions 178 which are executed by the processor 172 to cause the server computing system 170 to perform operations.

In some implementations, the one or more remote computing systems 170 includes or is otherwise implemented by one or more computing devices. In instances in which the one or more remote computing systems 170 includes plural computing devices, such computing devices can operate according to sequential computing architectures, parallel computing architectures, and/or some combination thereof. Furthermore, the one or more remote computing systems 170 can be used to collect, generate, send, and or receive one or more signals and/or data including location data and/or one or more semantic tags that can be associated with one or more locations and/or one or more features of the one or more locations. The one or more remote computing systems 170 can include a smart phone device that a user of the smart phone device can use to generate location data and/or a semantic tag associated with one or more images captured by a camera of the smart phone device. For example, the user of the smart phone device can capture an image of a location (e.g., a restaurant) that includes a latitude and longitude of the location as well as geolocation information embedded in the image. The user can then manually annotate the image with a semantic tag that includes a description of the location (e.g., how crowded the location is at a particular time of day) which is then sent to the server computing system 170 which includes an image repository. The manually annotated image can be strongly encrypted, anonymized (e.g., any personal information associated with the image is either not collected or is deleted after being received), and maintained in a privacy enhancing way for use by the server computing system 170 which can provide the image and the associated location data and/or semantic tag for use an image content analysis portion of the server computing system 170 and/or the training computing system 150.

The network 180 can include any type of communications network, including a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1 illustrates one example computing system that can be used to implement the present disclosure. Other computing systems can be used as well. For example, in some implementations, the computing device 102 can include the model trainer 160 and the training dataset 162. In such implementations, the one or more machine-learned models 120 can be both trained and used locally at the computing device 102. In some of such implementations, the computing device 102 can implement the model trainer 160 to personalize the one or more machine-learned models 120 based on user-specific data.

FIG. 2 depicts a diagram of an example device according to example embodiments of the present disclosure. A computing device 200 can include one or more features of the computing device 102, the server computing system 130, and/or the training computing system 150. Furthermore, the computing device 200 can perform one or more actions and/or operations including the one or more actions and/or operations performed by the computing device 102, the server computing system 130, and/or the training computing system 150, which are depicted in FIG. 1.

As shown in FIG. 2, the computing device 200 can include one or more memory devices 202, location data 204, semantic tag data 206, one or more interconnects 232, one or more processors 220, a network interface 222, one or more mass storage devices 224, one or more output devices 226, a sensor array 228, and one or more input devices 230.

The one or more memory devices 202 can store information and/or data (e.g., the location data 204 and/or the semantic tag data 206) including information associated with the processing of one or more instructions that are used to perform one or more actions and/or operations including accessing location data and/or semantic tags; identifying location data and/or semantic tags that satisfy suitability criteria; determining a suitable location based on the location data and/or semantic tags that satisfy the suitability criteria; and/or generating a description of the suitable location.

The location data 204 can include one or more portions of the data 116, the data 136, and/or the data 156 which are depicted in FIG. 1. Furthermore, the location data 204 can include information associated with one or more interactions, one or more maps, one or more semantic tags (e.g., semantic tags embedded in the one or more maps which can include one or more semantic tags in the semantic tag data 206), sensor outputs, and/or machine-learned models.

Figure 8:
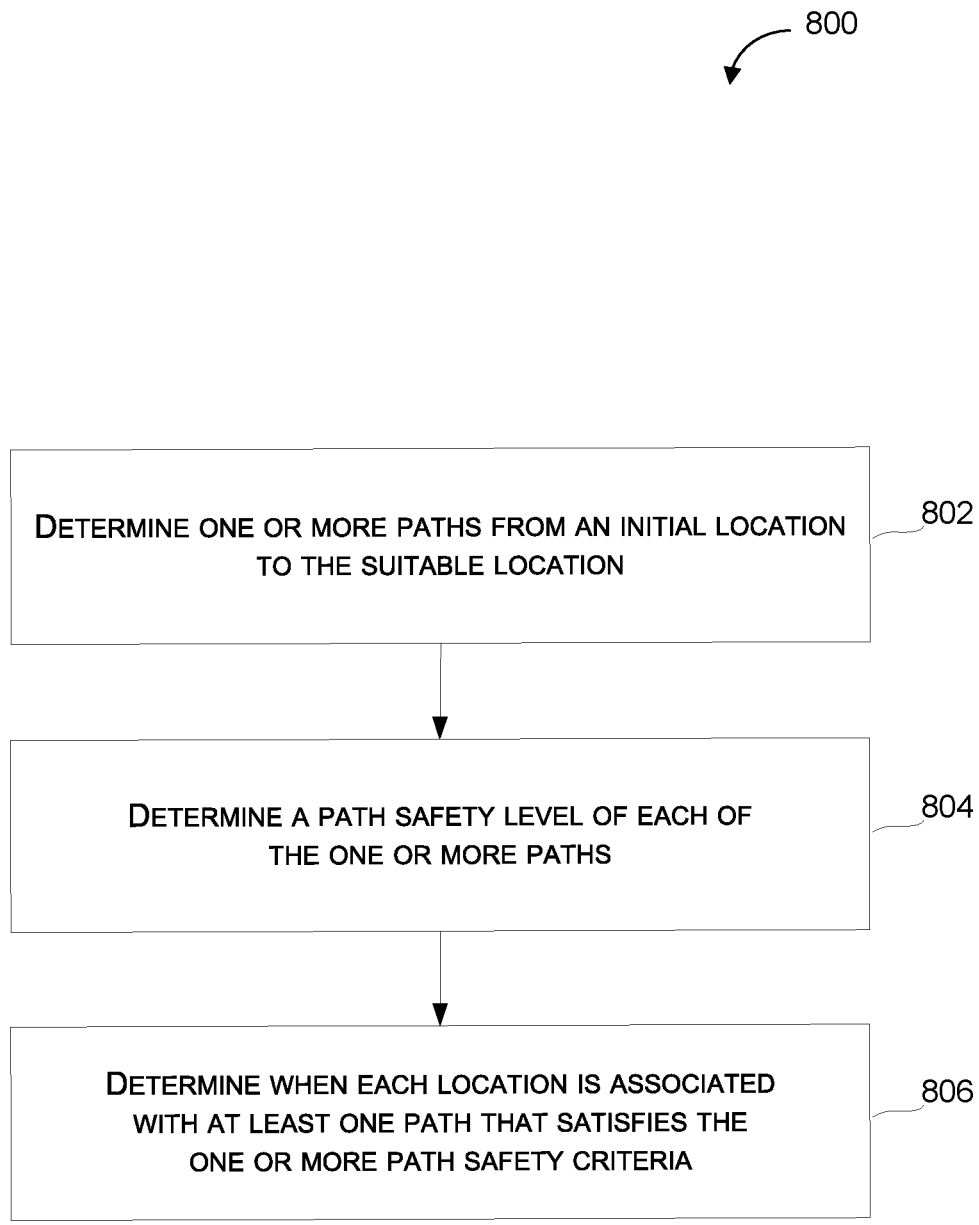
FIG. 8 depicts a flow diagram of determining suitable locations according to example embodiments of the present disclosure.

The semantic tag data 206 can include one or more portions of the data 116, the data 136, and/or the data 156 which are depicted in FIG. 1. Furthermore, the semantic tag data 206 can include information associated with one or more semantic tags including semantic tags used to describe one or more features of images (e.g., images retrieved from image databases) and/or one or more maps (e.g., one or more maps in the location data 204). Furthermore, the semantic tag data can include a plurality of semantic tags which can include one or more features of the plurality of semantic tags described in the method 800 that is depicted in FIG. 8.

The one or more interconnects 210 can include one or more interconnects or buses that can be used to send and/or receive one or more signals (e.g., electronic signals) and/or data (e.g., the location data 204 and/or the semantic tag data 206) between components of the computing device 200, including the one or more memory devices 202, the one or more processors 220, the network interface 222, the one or more mass storage devices 224, the one or more output devices 226, the sensor array 228, and/or the one or more input devices 230. The one or more interconnects 210 can be arranged or configured in different ways including as parallel or serial connections. Further the one or more interconnects 210 can include one or more internal buses to connect the internal components of the computing device 200; and one or more external buses used to connect the internal components of the computing device 200 to one or more external devices. By way of example, the one or more interconnects 210 can include different interfaces including Industry Standard Architecture (ISA), Extended ISA, Peripheral Components Interconnect (PCI), PCI Express, Serial AT Attachment (SATA), HyperTransport (HT), USB (Universal Serial Bus), Thunderbolt, IEEE 1394 interface (FireWire), and/or other interfaces that can be used to connect components.

The one or more processors 220 can include one or more computer processors that are configured to execute the one or more instructions stored in the one or more memory devices 202. For example, the one or more processors 220 can, for example, include one or more general purpose central processing units (CPUs), application specific integrated circuits (ASICs), and/or one or more graphics processing units (GPUs). Further, the one or more processors 220 can perform one or more actions and/or operations including one or more actions and/or operations associated with the location data 204 and/or the semantic tag data 206. For example, the one or more processors 220 can include single or multiple core devices including a microprocessor, microcontroller, integrated circuit, and/or logic device.

The network interface 222 can support network communications. For example, the network interface 222 can support communication via networks including a local area network and/or a wide area network (e.g., the Internet). The one or more mass storage devices 224 (e.g., a hard disk drive and/or a solid state drive) can be used to store data including the location data 204 and/or the semantic tag data 206. The one or more output devices 226 can include one or more display devices (e.g., LCD display, OLED display, and/or CRT display), one or more light sources (e.g., LEDs), one or more loud speakers, and/or one or more haptic output devices.

The one or more input devices 230 can include one or more keyboards, one or more touch sensitive devices (e.g., a touch screen display), one or more buttons (e.g., ON/OFF buttons, YES/NO buttons), one or more microphones, and/or one or more cameras (e.g., cameras that can be used for the detection of gestures and/or facial expressions).

The one or more memory devices 202 and the one or more mass storage devices 224 are illustrated separately, however, the one or more memory devices 202 and the one or more mass storage devices 224 can be regions within the same memory module. The computing device 200 can include one or more additional processors, memory devices, network interfaces, which may be provided separately or on a same chip or board. The one or more memory devices 202 and the one or more mass storage devices 224 can include one or more computer-readable media, including, but not limited to, non-transitory computer-readable media, RAM, ROM, hard drives, flash drives, and/or other memory devices.

The one or more memory devices 202 can store sets of instructions for applications including an operating system that can be associated with various software applications or data. The one or more memory devices 202 can be used to operate various applications including a mobile operating system developed specifically for mobile devices. As such, the one or more memory devices 202 can store instructions that allow the software applications to access data including wireless network parameters (e.g., identity of the wireless network, quality of service), and invoke various services including telephony, location determination (e.g., via global positioning service (GPS) or WLAN), and/or wireless network data call origination services. In other embodiments, the one or more memory devices 202 can be used to operate or execute a general-purpose operating system that operates on both mobile and stationary devices, such as smartphones and desktop computers, for example.

The software applications that can be operated or executed by the computing device 200 can include applications associate with the system 100 shown in FIG. 1. Further, the software applications that can be operated or executed by the computing device 200 can include native applications and/or web-based applications.

In some embodiments, the computing device 200 can be associated with or include a positioning system (not shown). The positioning system can include one or more devices or circuitry for determining the position of the computing device 200. For example, the positioning device can determine actual or relative position by using a satellite navigation positioning system (e.g. a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, beacons, and the like and/or other suitable techniques for determining position.

Figure 3:
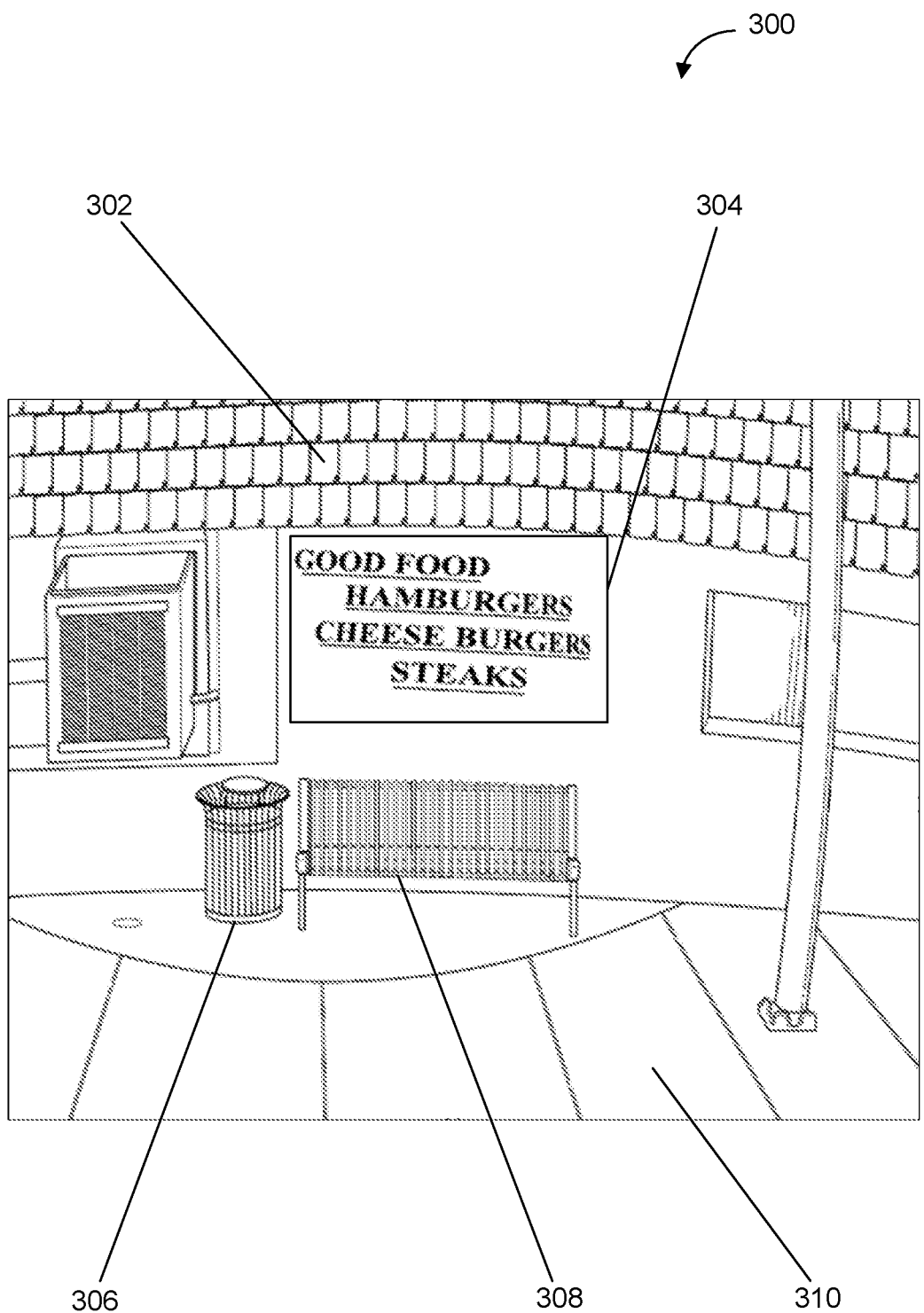
FIG. 3 depicts an example of feature detection and image content analysis according to example embodiments of the present disclosure.

FIG. 3 depicts an example of feature detection and image content analysis according to example embodiments of the present disclosure. The image illustrated in FIG. 3 can be generated and/or determined by a computing system or computing device that includes one or more features of the computing device 102, the server computing system 130, and/or the training computing system 150, which are depicted in FIG. 1. As shown in FIG. 3, the image 300 includes an overhang feature 302, a signage feature 304, a garbage can feature 306, a bench feature 308, and a sidewalk feature 310.

The image 300 depicts a location with one or more features including one or more features associated with various objects in the environment depicted in the image 300 that have been identified by a computing system (e.g., a content analysis system including one or more machine learned models trained to detect one or more features of input content which can include or more images). For example, the computing system can include one or more aspects of the computing device 102, the server computing system 130, and/or the training computing system 150. Further, the one or more features of the image 300, including the overhang feature 302, the signage feature 304, the garbage can feature 306, the bench feature 308, and/or the sidewalk feature 310, can be associated with various semantic tags (e.g., semantic tags that include one or more features of the plurality of semantic tags described in the method 800 that is depicted in FIG. 8) that can include descriptions of various aspects of the one or more features. For example, the one or more features of the image 300 can be associated with one or more of a plurality of semantic tags based on image content analysis performed by one or more machine-learned models that include one or more aspects of the one or more machine-learned models 120 that are depicted in FIG. 1. Furthermore, the image 300 can be associated with location data (e.g., metadata included in the image 300) that can include a location (e.g. latitude, longitude, and/or altitude) that is associated with the image 300, features depicted in the image 300 (e.g., the overhang feature 302), and/or the vantage point from which the image 300 was captured.

In this example, the overhang feature 302 can be associated with a semantic tag (e.g., a semantic tag including the word "overhang" and/or "restaurant overhang") that indicates increased safety resulting from the overhang being attached to a restaurant which is commonly frequented by people and may facilitate access to assistance when required (e.g., access to a telephone). For example, the user of a geographic context application (e.g., a mapping program) may have a greater sense of safety when standing beneath the overhang represented by the overhang feature 302. Further, the overhang feature 302 may be associated with increased capacity since the overhang feature 302 may allow a greater number of people to congregate in the location depicted in the image 300. For example, the overhang represented by the overhang feature 302 may provide shelter that enables an increased capacity of people in comparison to a similar location without an overhang to provide shelter from the elements. Additionally, the overhang feature 302 may be associated with a minimal amount of change (e.g., an increase or decrease) in the aesthetic appeal of the location depicted in the image 300. For example, the overhang feature 302 does not include any ornamentation or designs that would increase the aesthetic appeal of the location depicted in the image 300. Furthermore, the overhang feature 302 can be associated with increased convenience resulting from the shelter that the overhang can provide from the elements (e.g., rain, sunlight, and/or snow). For example, the user of a geographic context application (e.g., an augmented reality game) can enjoy their game under the shelter of the overhang represented by the overhang feature 302.

The signage feature 304 can be associated with a semantic tag (e.g., a semantic tag including the word "signage" and/or "restaurant signage") that indicates increased safety resulting from the signage feature indicating the presence of a restaurant which may be commonly frequented by people and may provide a person with access to assistance when required (e.g., access to first-aid in the restaurant). For example, the user of a geographic context application (e.g., a mapping program) may have a greater sense of safety when standing next to the sign (e.g., "Good food Hamburgers Cheese Burgers Steaks") represented by the signage feature 304 due to the potential increased safety resulting from proximity to a restaurant. Further, the signage feature 304 may be associated with the capacity of the restaurant associated with the signage feature 304. For example, the restaurant associated with the signage feature 304 may have a capacity of fifty people and may provide seating and/or sustenance to a user of a geographic context application. Additionally, due to its plain appearance, the signage feature 304 may be associated with a minimal change (e.g., an increase or decrease) in the aesthetic appeal of the location depicted in the image 300. For example, the signage feature 304 is plain and does not include any ornamentation or designs that would increase the aesthetic appeal of the location depicted in the image 300. Furthermore, the signage feature 304 can be associated with increased convenience since one purpose of the signage feature 304 is to attract people to the associated restaurant and provide amenities (e.g., food, drink, seating, and/or music) to the people that congregate at the restaurant. For example, the user of a geographic context application (e.g., an augmented reality game) can enjoy their game inside the restaurant associated with the signage feature 304.

The garbage can feature 306 can be associated with a semantic tag (e.g., a semantic tag including the word "garbage can", "dust bin", "waste basket", and/or "trash can") that may be indicative of increased safety in the location depicted in the image 300. For example, the user of a geographic context application (e.g., an augmented reality game) may have a greater sense of safety when in proximity to the garbage can represented by the garbage can feature 306 since garbage cans are commonly placed in locations that warrant a garbage can due to the non-trivial numbers of people that pass by. Further, the garbage can feature 306 may be associated with increased capacity since the presence of a garbage can is indicative of an increased amount of people in the area (e.g., people that need a place to put their litter). For example, the size and/or number of garbage cans at a location can be indicative of increased capacity at the location since the amount of garbage cans provided at a location can correspond to the amount of people producing litter at the location. Additionally, the garbage can feature 306 may be associated with either an increase or a decrease in the aesthetic appeal of the location depicted in the image 300. For example, the appearance of the garbage can represented by the garbage can feature 306 may not be aesthetically appealing and may have a negative aesthetic appeal. Conversely, the presence of the garbage can feature 306 may be associated with more aesthetically appealing environment around the garbage can feature 306 since litter may be placed in the garbage can instead of being left strewn on the ground. Furthermore, the garbage can feature 306 can be associated with increased convenience since the garbage can feature provides a place for the user of a geographic context application to put their litter. For example, the user of a geographic context application (e.g., an augmented reality game) can enjoy a snack while playing a game and can then deposit the snack's wrapper in the garbage can represented by the garbage can feature 306.

The bench feature 308 can be associated with a semantic tag (e.g., a semantic tag including the word "bench", "seat", and/or "chair") that may be indicative of increased safety in the location depicted in the image 300. For example, the user of a geographic context application (e.g., a mapping application) may have a greater sense of safety when in proximity to the bench represented by the bench feature 308 since benches are commonly placed in locations at which people pass through and desire to sit down. Further, the bench feature 308 may be associated with increased capacity since the presence of a bench is indicative of an increased amount of people in the area (e.g., people that need a place to sit). For example, the size and/or number of benches at a location can be indicative of increased capacity of the location. Additionally, the bench feature 308 may be associated with an increase in the aesthetic appeal of the location depicted in the image 300. For example, the bench represented by the bench feature 308 may increase the aesthetic appeal of a location by providing a place for a person to sit, thereby providing more options when using a geographic context application that involves capturing photographs (e.g., a person can pose for photographs in various ways while seated on the bench). Furthermore, the bench feature 308 can be associated with increased convenience since the bench feature provides a place for the user of a geographic context application to sit and rest. For example, the user of a geographic context application (e.g., an augmented reality game) can play the augmented reality game while sitting on the bench represented by the bench feature 308.

In this example, the sidewalk feature 310 can be associated with a semantic tag (e.g., a semantic tag including the word "sidewalk", and/or "walkway") that may be indicative of increased safety in the location depicted in the image 300. For example, the user of a geographic context application (e.g., a mapping application) may have a greater sense of safety standing on a sidewalk represented by the sidewalk feature 310 since sidewalks are commonly free from the potentially harmful vehicular traffic found on roads. Further, the sidewalk feature 310 may be associated with increased capacity since the presence of a sidewalk is indicative of an increased amount of people in the area (e.g., pedestrians that need a sidewalk to walk on). Further, the size and/or number of sidewalks at a location can be indicative of increased capacity of the location. Additionally, the sidewalk represented by the sidewalk feature 310 may have a neutral effect with respect to the aesthetic appeal of a location since the sidewalk feature 310 is plain and is not ornamented and/or decorated (e.g., different colors, patterns, and/or textures on the sidewalk) in a way that is aesthetically appealing. Furthermore, the sidewalk feature 310 can be associated with decreased convenience since the sidewalk associated with the sidewalk feature 310 may become occupied by pedestrians passing through. For example, the user of a geographic context application (e.g., an augmented reality game) may be disrupted by pedestrians walking on the sidewalk represented by the sidewalk feature 310.

Figure 4:
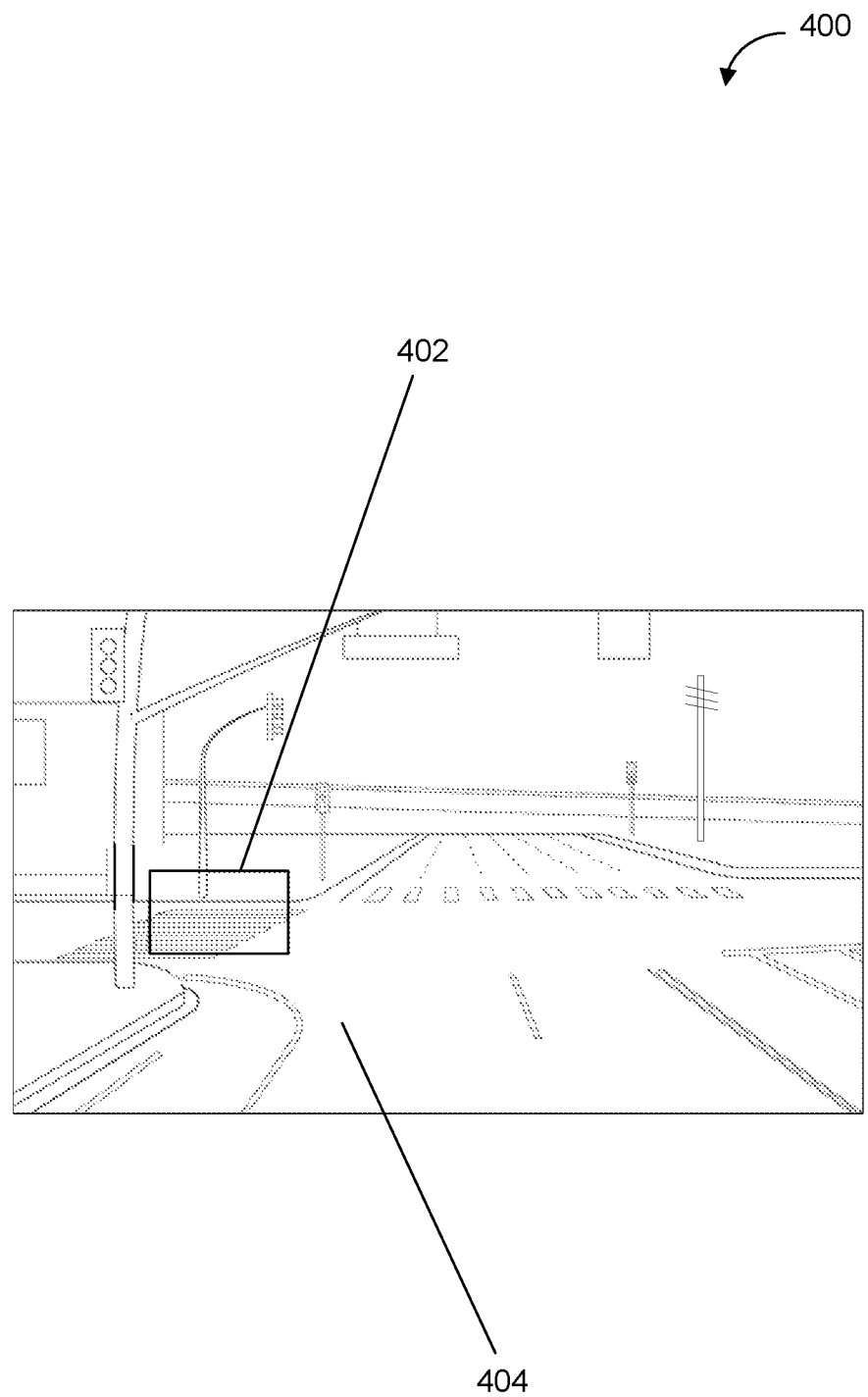
FIG. 4 depicts an example of feature detection and image content analysis according to example embodiments of the present disclosure.

FIG. 4 depicts an example of feature detection and image content analysis according to example embodiments of the present disclosure. The image illustrated in FIG. 4 can be generated and/or determined by a computing system or computing device that includes one or more features of the computing device 102, the server computing system 130, and/or the training computing system 150, which are depicted in FIG. 1. As shown in FIG. 4, the image 400 includes a crosswalk feature 402 and a road feature 404.

The image 400 depicts a location with one or more features including one or more features associated with various objects in the environment depicted in the image 400 that have been identified by a computing system (e.g., a content analysis system including one or more machine learned models trained to detect one or more features of input content which can include or more images). For example, the computing system can include one or more aspects of the computing device 102, the server computing system 130, and/or the training computing system 150. Further, the one or more features of the image 400, including the crosswalk feature 402 and/or the road feature 404, can be associated with various semantic tags (e.g., semantic tags that include one or more features of the plurality of semantic tags described in the method 800 that is depicted in FIG. 8) that can include descriptions of various aspects of the one or more features. For example, the one or more features of the image 400 can be associated with one or more of a plurality of semantic tags based on image content analysis performed by one or more machine-learned models that include one or more aspects of the one or more machine-learned models 120 that are depicted in FIG. 1. Furthermore, the image 400 can be associated with location data (e.g., metadata included in the image 400) that can include a location (e.g. latitude, longitude, and/or altitude) that is associated with the image 400, features depicted in the image 400 (e.g., the crosswalk feature 402), and/or the vantage point from which the image 400 was captured.

In this example, the crosswalk feature 402 can be associated with a semantic tag (e.g., a semantic tag including the word "crosswalk", and/or "pedestrian crossing") that may be indicative of increased safety in the location depicted in the image 400. For example, the user of a geographic context application (e.g., a mapping application) may have a greater sense of safety traversing a crosswalk represented by the crosswalk feature 402 instead of crossing a road at a location without a crosswalk. Further, the crosswalk feature 402 may be associated with increased capacity since the presence of a crosswalk is indicative of an increased amount of people in an area (e.g., people that need a crosswalk to cross a road).

For example, the size and/or number of crosswalks at a location can be indicative of increased capacity of the location. Additionally, the crosswalk represented by the crosswalk feature 402 may have a neutral effect with respect to the aesthetic appeal of a location since the crosswalk feature 402 has a utilitarian design and is not ornamented and/or decorated (e.g., different colors, patterns, and/or textures on the crosswalk in way that is aesthetically appealing). Furthermore, the crosswalk feature 402 can be associated with increased convenience since the crosswalk associated with the crosswalk feature 402 may allow pedestrians to traverse an area more conveniently (e.g., more quickly and efficiently). For example, the user of a geographic context application (e.g., a mapping application) may more conveniently traverse the location depicted in the image 400 by using the crosswalk represented by the crosswalk feature 402.

In this example, the road feature 404 can be associated with a semantic tag (e.g., a semantic tag including the word "road", "street", "roadway", and/or "thoroughfare") that may be indicative of decreased safety in the location depicted in the image 400. For example, the user of a geographic context application (e.g., an augmented reality game) may have a reduced sense of safety when in close proximity to a road represented by the road feature 404 since vehicular traffic on the road may present a risk to the user. Further, the road feature 404 may be beneficial or disadvantageous with respect to capacity since the road feature 404 may be more useful for some geographic context applications than for others. For example, the larger capacity of the road feature 404 may be beneficial to the user of a mapping application that is operated from inside a vehicle. On the other hand, the larger capacity of the road feature 404 may present a limitation to the user of a geographic context application that is intended to be used by a pedestrian (e.g., the road feature 404 may demarcate an area in which the geographic context application may not be used). Additionally, the road represented by the road feature 404 may have a neutral effect with respect to the aesthetic appeal of a location since the road feature 404 has a utilitarian design and is not ornamented and/or decorated (e.g., different colors, patterns, and/or textures on the road in way that is aesthetically appealing). Furthermore, the road feature 404 may be associated with increased convenience depending on the type of geographic context application that is used. For example, the user of a geographic context application (e.g., a mapping application) in a vehicle may more conveniently traverse the location depicted in the image 400 by using the road represented by the road feature 404. In another example, the user of a geographic context application (e.g., an augmented reality game) may be inconvenienced by the road feature 404 since it does not include amenities (e.g., a lavatory), is not convenient to stand or sit in, and may present a the risk of disruption by vehicular traffic.

Figure 5:
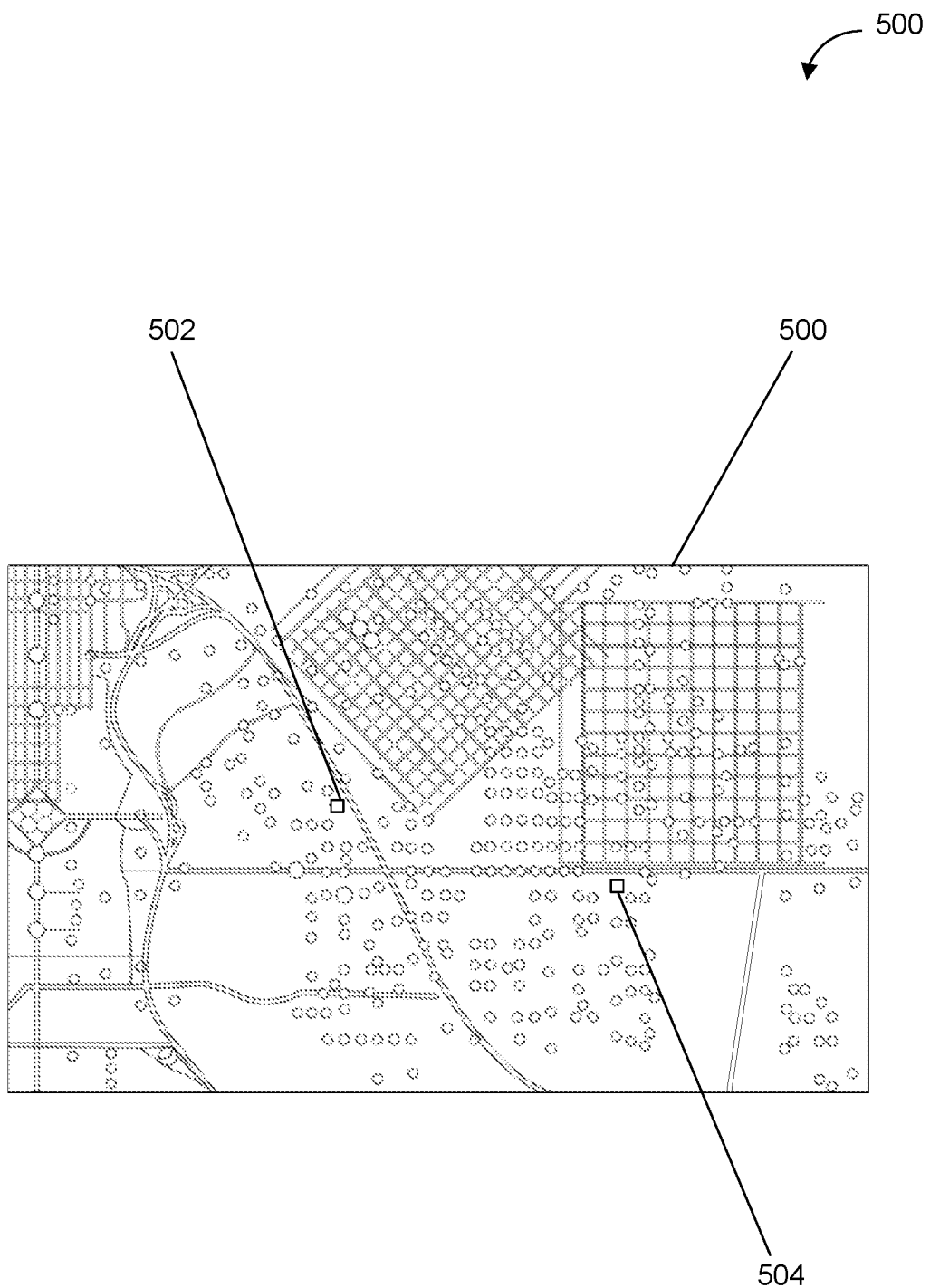
FIG. 5 depicts an example of identifying suitable locations according to example embodiments of the present disclosure.

FIG. 5 depicts an example of identifying suitable locations according to example embodiments of the present disclosure. The image illustrated in FIG. 5 can be generated and/or determined by a computing device or computing system that includes one or more features of the computing device 102, the server computing system 130, and/or the training computing system 150, which are depicted in FIG. 1. As shown in FIG. 5, the image 500 includes a location 502 and a location 504.

Figure 7:
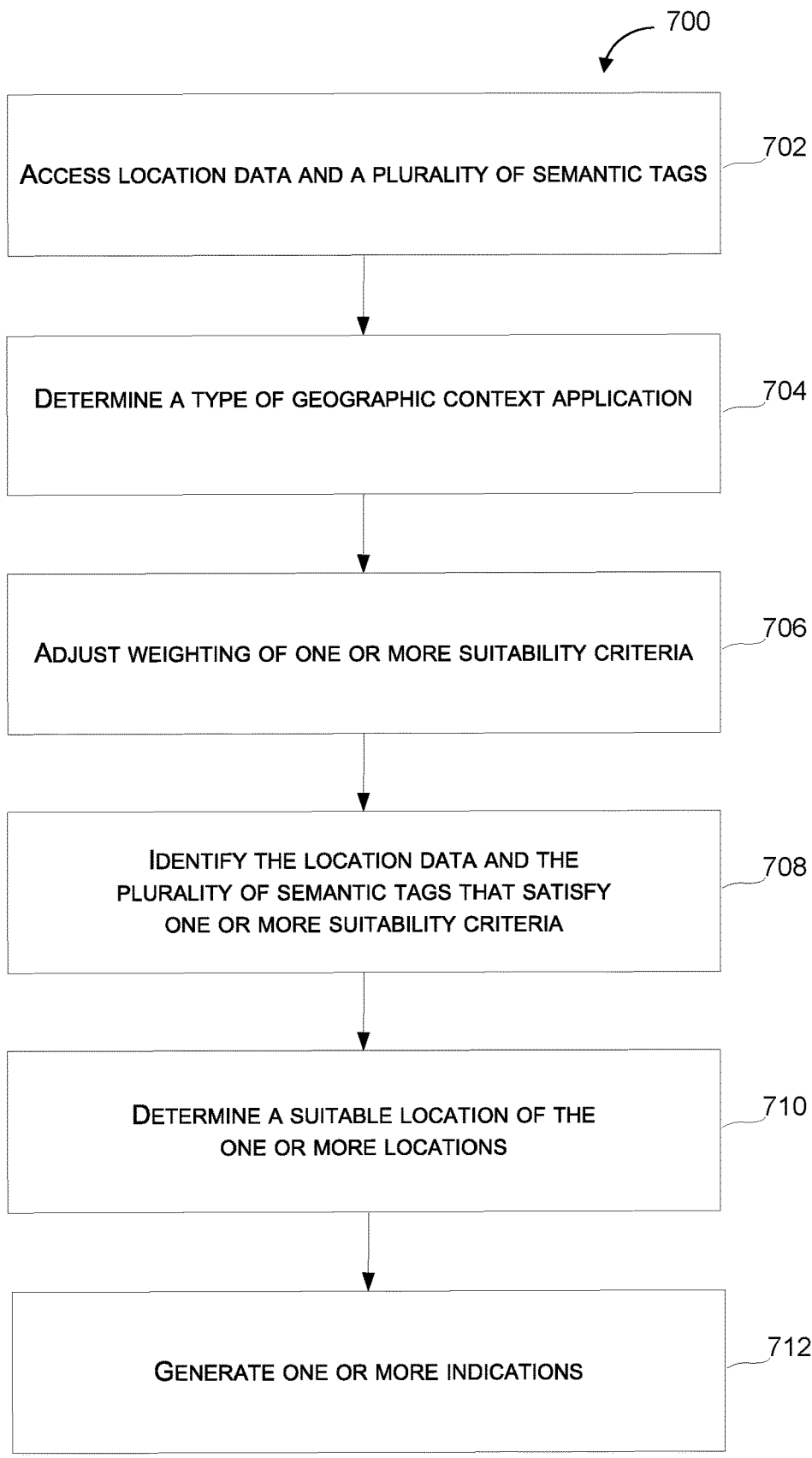
FIG. 7 depicts a flow diagram of determining suitable locations according to example embodiments of the present disclosure.

The image 500 is a map of an area (Denver and the environs surrounding Denver) including representations of locations associated with one or more semantic tags (e.g., one or more semantic tags that include one or more features of the plurality of semantic tags described in the method 700 that is depicted in FIG. 7) that are associated with a particular type of crosswalk (e.g., the crosswalk feature 402 that is depicted in FIG. 4, which includes alternating lines painted on the ground). The feature indicated by the semantic tag (e.g. "crosswalk" or "zebra crossing") may be indicative of a location suitable for use by a geographic context application. For example, the presence of a crosswalk can increase the safety of a user of a geographic context application traversing an area that includes streets. In determining a location that is suitable for use by a geographic context application, the crosswalk feature indicated by the crosswalk semantic tag may influence the identification of a location as being suitable. Accordingly, all other things being equal, the location 502 and the location 504 are more likely to be identified as a suitable location than other areas with the same features except for the crosswalk feature. For example, based in part on the presence of the crosswalk feature, the computing device 102 depicted in FIG. 1 can select the location 502 and/or the location 504 as a location that is suitable for use by a geographic context application.

Figure 6:
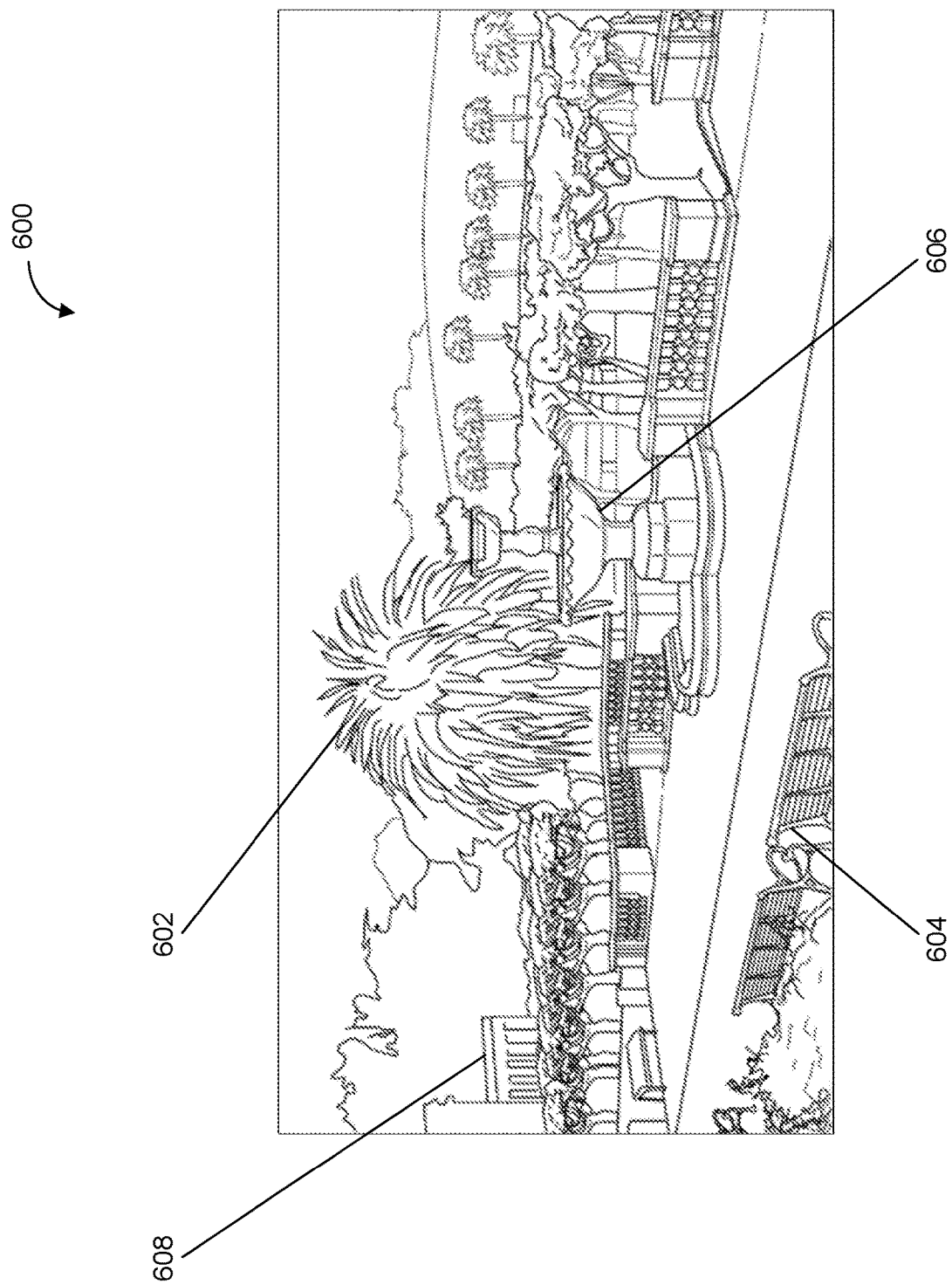
FIG. 6 depicts an example of feature detection and image content analysis according to example embodiments of the present disclosure.

FIG. 6 depicts an example of feature detection and image content analysis according to example embodiments of the present disclosure. The image illustrated in FIG. 6 can be generated and/or determined by a computing system or computing device that includes one or more features of the computing device 102, the server computing system 130, and/or the training computing system 150, which are depicted in FIG. 1. As shown in FIG. 6, the image 600 includes a palm tree feature 602, a bench feature 604, a fountain feature 606, and a columns feature 608.

The image 600 depicts a location with one or more features including one or more features associated with various objects in the environment depicted in the image 600 that have been identified by a computing system (e.g., a content analysis system including one or more machine learned models trained to detect one or more features of input content which can include or more images). For example, the computing system can include one or more aspects of the computing device 102, the server computing system 130, and/or the training computing system 150. Further, the one or more features of the image 600, including the palm tree feature 602, the bench feature 604, the fountain feature 606, and the columns feature 608, can be associated with various semantic tags (e.g., semantic tags that include one or more features of the plurality of semantic tags described in the method 800 that is depicted in FIG. 8) that can include descriptions of various aspects of the one or more features. For example, the one or more features of the image 600 can be associated with one or more of a plurality of semantic tags based on image content analysis performed by one or more machine-learned models that include one or more aspects of the one or more machine-learned models 120 that are depicted in FIG. 1. Furthermore, the image 600 can be associated with location data (e.g., metadata included in the image 600) that can include a location (e.g. latitude, longitude, and/or altitude) that is associated with the image 600, features depicted in the image 600 (e.g., the palm tree feature 602), and/or the vantage point from which the image 600 was captured.

In this example, the palm tree feature 602 can be associated with a semantic tag (e.g., a semantic tag including the word "palm tree", "palm", and/or "tree") that may be neutral with respect to safety in the location depicted in the image 600. For example, the presence of a palm tree or other type of tree may have a minimal effect on the safety of operating a geographic context application at a location proximate to the palm tree. Further, the palm tree feature 602 may be neutral with respect to capacity since the presence of a palm tree may have a minimal effect on the number of people that can congregate in an area. Additionally, the palm tree feature 602 may be associated with an increase in the aesthetic appeal of the location depicted in the image 600 since a palm tree feature 602 may be considered to be intrinsically aesthetically appealing. The shape and color of the palm tree represented by the palm tree feature 602 may have an intrinsic aesthetic appeal that may enhance the appearance of a location in which the palm tree is present. For example, the palm tree feature 602 may enhance the aesthetic appeal of a location used by a geographic context application such as a photography application in which a photograph of the palm tree feature 602 is captured. Furthermore, the palm tree feature 602 may be neutral with respect to convenience since the palm tree feature may not necessarily increase or decrease the convenience of using a geographic context application at a location.

In this example, the bench feature 604 can be associated with a semantic tag (e.g., a semantic tag including the word "bench", "seat", and/or "chair") that may be indicative of increased safety in the location depicted in the image 600. For example, the user of a geographic context application (e.g., an augmented reality game) may have a greater sense of safety when in proximity to the bench represented by the bench feature 604 since benches are commonly placed in locations that receive significant numbers of people who walk by and sit down. Further, the bench feature 604 may be associated with increased capacity since the presence of a bench is indicative of an increased amount of people in the area (e.g., people that need a place to sit or rest). For example, the size and/or number of benches at a location can be indicative of increased capacity at a location. Additionally, the bench feature 604 may be associated with an increase in the aesthetic appeal of the location depicted in the image 600. For example, the bench represented by the bench feature 604 may have an aesthetically appealing design (e.g., wrought iron with intricately curving lines). Furthermore, the bench feature 604 can be associated with increased convenience since the bench feature provides a place for the user of a geographic context application to sit and relax while operating the geographic context application. For example, the user of a geographic context application (e.g., a mapping application) may use the application while sitting on the bench represented by the bench feature 604.

The fountain feature 606 can be associated with a semantic tag (e.g., a semantic tag including the word "fountain", "recreation pool", and/or "water play area") that may be neutral with respect to safety in the location depicted in the image 600. For example, the presence of a fountain may have a minimal impact on the safety of operating a geographic context application at a location proximate to the fountain. In some instances, a fountain feature may be associated with an increase in safety that may result from a greater amount of people visiting the fountain and thereby providing safety in numbers which may result from reticence to engage in harmful behavior in the presence of a crowd. Further, the fountain feature 606 may be associated with a greater capacity (e.g., greater capacity with respect to an average capacity of other locations) since the presence of a fountain may be accompanied by an area around the fountain for people to gather and enjoy the fountain. Additionally, the fountain feature 606 may be associated with an increase in the aesthetic appeal of the location depicted in the image 600 since a fountain feature 606 may be considered to be intrinsically aesthetically appealing. The shape (e.g., ornamental and decorative design of the fountain including statues that are a part of the fountain) and color (e.g., the color of the material from which one or more portions of the fountain are constructed including various stones and precious metals) of the fountain represented by the fountain feature 606 may have an aesthetic appeal that may enhance the appearance of a location in which the fountain is present. For example, the fountain feature 606 may enhance the aesthetic appeal of a location used by a geographic context application including a photography application in which the fountain feature 606 may form an aesthetically appealing part of a photograph. Furthermore, the fountain feature 606 may be associated with increased convenience since the fountain feature 606 is representative of an object (a fountain) that is designed to accommodate people lingering and engaging in recreational activities around it.

The columns feature 608 can be associated with a semantic tag (e.g., a semantic tag including the word "columns" and/or "column") that may be neutral with respect to safety in the location depicted in the image 600. For example, the presence of ornamental columns and/or other types of ornamental structure may have a minimal effect on the safety of operating a geographic context application at a location proximate to the columns. In some instances, a columns feature may be associated with an increase in safety that may result from a greater amount of people visiting the columns (e.g., visiting the columns to capture photographs) thereby reducing the incidence of situations in which a person is isolated at the location. Further, the columns feature 608 may be associated with a greater capacity (e.g., greater capacity with respect to an average capacity of other locations) since the presence of a columns may be accompanied by an area around the columns for people to gather and walk around the columns. Additionally, the columns feature 608 may be associated with an increase in the aesthetic appeal of the location depicted in the image 600 since a columns feature 608 may be considered to be intrinsically aesthetically appealing. The shape (e.g., ornamental and decorative design of the columns including the use of Ionic, Doric, or Corinthian designs) and color (e.g., the color of the stone from which the columns are constructed) of the columns represented by the columns feature 608 may have an aesthetic appeal that may improve the appearance of a location in which the columns feature 608 is present. For example, the columns feature 608 may enhance the aesthetic appeal of a location used by a geographic context application including an augmented reality game in which the columns feature 608 may form an aesthetically appealing backdrop for a game set in ancient times (e.g., ancient Greece or ancient Rome). Furthermore, the columns feature 608 may be associated with increased convenience since the columns feature 608 is representative of an object (columns) that was built as part of a structure around which various people (e.g., tourists) gather.

FIG. 7 depicts a flow diagram of an example method for determining suitable locations according to example embodiments of the present disclosure. One or more portions of the method 700 can be executed or implemented on one or more computing devices or computing systems including, for example, the computing device 102, the server computing system 130, and/or the training computing system 150. Further, one or more portions of the method 700 can be executed or implemented as an algorithm on the hardware devices or systems disclosed herein. FIG. 7 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 702, the method 700 can include accessing location data and/or a plurality of semantic tags. The location data can include information associated with one or more interactions at one or more locations. The plurality of semantic tags can include information associated with a plurality of images of the one or more locations. Further, each semantic tag of the plurality of semantic tags can include information associated with one or more features depicted by the plurality of images of the one or more locations.

In some embodiments, the location data can include information associated with one or more interactions (e.g., interactions by one or more people and/or one or more vehicles) at the one or more locations including a number of photographs captured at each of the one or more locations, a number of pedestrians that pass through each of the one or more locations. Further, the location data can include information associated with the locations of amenities (e.g., seats and/or lavatories) at each of the one or more locations, and/or the location of attractions at each of the one or more locations (e.g., the location of restaurants, shopping areas, and/or places of entertainment).

The location data can also include information associated with one or more maps which can indicate the location of roads (e.g., streets, highways, and/or alleyways), buildings, bodies of water, waterways, bridges, tunnels, overpasses, and/or underpasses. The location data can also include information associated with traffic regulations (e.g., speed limits in a location, the locations of traffic lights, and/or the locations of stop signs), traffic flow patterns (e.g., the direction and/or amount of vehicular traffic in an area), and/or the locations of one or more hazards including construction zones.

In some embodiments, each semantic tag of the plurality of semantic tags and/or the location data can be associated with information including: a location (e.g., a street address and/or an altitude, latitude, and longitude) which can be associated with the one or more locations; a time of day (e.g., a time of day when a semantic tag was generated, modified, and/or most recently accessed) which can be associated with the one or more locations; and/or a date (e.g., a date when a semantic tag was generated, modified, and/or most recently accessed) which can be associated with the one or more locations.

In some embodiments, each semantic tag of the plurality of semantic tags can be descriptive of one or more features (e.g., one or more features of a location of the one or more locations) which can be associated with the one or more locations. For example, each semantic tag of the plurality of semantic tags can include information associated with one or more features including: physical dimensions (e.g., physical dimensions of one or more objects at a location); and/or object identities (e.g., the identity of objects at each location). Furthermore, the one or more features of the one or more locations can include one or more features of: objects in each location of the one or more locations including buildings, utility poles, trees, mail boxes, benches, and/or garbage cans; one or more surfaces of each location of the one or more locations (e.g., paved roads, lawns, and/or bodies of water); traffic signage (e.g., traffic signs and/or traffic indications on roads); and/or light source features including the location of street lights.

In some embodiments, each semantic tag of the plurality of semantic tags can be associated with one or more features depicted by an image of the plurality of images. For example, each semantic tag can provide one or more semantic descriptions of one or more objects included within a scene depicted by one of the plurality of images. The plurality of images can include one or more digital images (e.g., a two dimensional image) of a portion of an environment (e.g., an image of a portion of a location of the one or more locations). Further, the plurality of images can be encoded in any type of image format including a combination of raster images (e.g., bitmaps comprising an array of pixels) and/or vector images (e.g., polygonal representations of images based on positions of coordinates including x and y axes of a two-dimensional plane). The images can include still images, image frames from a movie, and/or other types of imagery including LIDAR imagery, and/or RADAR imagery.

Examples of digital image formats used by the plurality of images can include JPEG (Joint Photographic Experts Group), BMP (Bitmap), TIFF (Tagged Image File Format), PNG (Portable Network Graphics), and/or GIF (Graphics Interchange Format). The images can be collected from various sources including user-submitted imagery, imagery in the public domain (e.g., anonymized imagery obtained via web crawl), and/or street-level panoramic imagery.

By way of example, the computing device 102 can receive data including the location data and/or the plurality of semantic tags via a communication network (e.g., a wireless and/or wired network including a LAN, WAN, or the Internet) through which one or more signals (e.g., electronic signals) and/or data can be sent and/or received. By way of further example, the computing device 102 can receive data including a plurality of semantic tags from one or more remote image repositories which include images that include embedded semantic tags identifying one or more features of the images.

At 704, the method 700 can include determining a type of the geographic context application. For example, the computing device 102 can access application type data associated with the type of application that is operating on the computing device 102 and determine, based on the application type data, that the geographic context application is an augmented reality game.

In some embodiments, the geographic context application can include an augmented reality application (e.g., an augmented reality game), a photography application (e.g., an application used to select locations at which to capture photographs), and/or a mapping application (e.g., an application used to assist in navigation of an area).

At 706, the method 700 can include determining a weighting of the one or more suitability criteria based at least in part on the type of the geographic context application. For example, the computing device 102 can determine the weight of the one or more suitability criteria associated with aesthetics (e.g., one or more aesthetic criteria) when the geographic context application is a photography application (e.g., an application that is used to select aesthetically appealing locations at which to capture photographs). Further, the weighting of the one or more suitability criteria associated with aesthetics for the photography application can be determined so that aesthetics are the primary criteria and that satisfaction of the one or more suitability criteria requires that the one or more aesthetic criteria are satisfied.

At 708, the method 700 can include identifying the location data and/or the plurality of semantic tags that satisfy one or more suitability criteria. For example, the computing device 102 can access data and/or information associated with the location data and/or the plurality of semantic tags. Further, the location data and/or each semantic tag of the plurality of semantic tags can be compared to each of the one or more suitability criteria that can be used to determine a location that is suitable for use by a geographic context application (e.g., an augmented reality game).

In some embodiments, the comparison (e.g., the comparison performed by the computing device 102) of the location data and/or each semantic tag can include a comparison to determine an extent to which the information in the location data and/or each semantic tag matches or is similar to the information in data associated with the one or more suitability criteria. Satisfaction of the one or more suitability criteria can include the contents of the location data and/or a semantic tag matching a suitability criterion (e.g., a semantic tag indicates the presence of a palm tree), exceeding a suitability criterion amount (e.g., the capacity of a location exceeding a predetermined capacity threshold measured in square meters), being less than a suitability criterion amount (e.g., the capacity of a location being less than a predetermined capacity threshold measured in square meters), and/or being within a suitability criterion range (e.g., the density of pedestrians at a location is greater than a minimum amount that is sparse and less than a maximum amount that is crowded).

At 710, the method 700 can include determining a suitable location of the one or more locations based at least in part on the location data and the plurality of semantic tags that satisfy the one or more suitability criteria. For example, the computing device 102 can determine one or more geographic locations that are associated with the location data and/or the plurality of semantic tags that satisfy the one or more suitability criteria. The computing device 102 can then determine a suitable location based on the one or more geographic locations associated with the plurality of semantic tags that satisfy the one or more suitability criteria (e.g., the geographic location with the most semantic tags that satisfy the one or more suitability criteria).

The suitable location can be determined based at least in part on various aspects or factors of suitability including: the safety of a location (e.g., locations that are further away from large volumes of vehicular traffic); the capacity of a location (e.g., the size and/or capacity of a location to accommodate people); the aesthetic appeal of a location (e.g., the attractiveness of a location which can be based at least in part on the number of aesthetically appealing features in comparison to the number of aesthetically unappealing features); the convenience of a location (e.g., the convenience of a location in terms of accessibility to a pedestrian and the extent to which the location can be used by a person for an extended period of time). Furthermore, the suitability of a location can be associated with one or more other characteristics of the location including the distinctiveness of one or more features at a location (e.g., the unusualness of the one or more features of a location); and/or the rarity or uncommonness of one or more features of the location.

By way of further example, a determination of a suitable location can be based, for example, on features of a location satisfying one or more safety criteria. As such, in one example, information (e.g., the absence of hazards) associated with a location can be used to determine that a location satisfies one or more safety criteria which in some embodiments can be associated with the safety of an area. By way of further example, satisfaction of the one or more suitability criteria can be based, for example, on a location satisfying one or more capacity criteria. Thus, in one example, information (e.g., the size of an area) associated with a location can be used to determine when a location satisfies one or more capacity criteria associated with the capacity of an area. By way of further example, satisfaction of the one or more suitability criteria can be based, for example, on a location satisfying one or more aesthetic criteria. For example, information (e.g., the number of aesthetically appealing features) associated with a location can be used to determine when a location satisfies one or more aesthetic criteria. By way of further example, satisfaction of the one or more suitability criteria can be based, for example, on features of a location satisfying one or more convenience criteria. By way of example, information (e.g., the amount of foot traffic through an area) associated with a location can be used to determine when a location satisfies one or more convenience criteria associated with the convenience of an area.

At 712, the method 700 can include generating one or more indications which can include a description of the suitable location based at least in part on the one or more features associated with the suitable location. For example, the computing device 102 can generate one or more indications of the one or more features (e.g., aesthetically appealing features) associated with the plurality of semantic tags that are associated with the plurality of locations within a predetermined radius of the suitable location. By way of further example, the computing device 102 can generate one or more natural language indications including one or more natural language textual indications (e.g., natural language textual indications presented in full sentences and generated on a display device associated with the computing device 102) and/or one or more audible indications (e.g., natural language audible indications using a synthetic voice and/or a pre-recorded voice that presents the description of the suitable location in full sentences).

In some embodiments, the one or more indications can include one or more images of the one or more locations (e.g., one or more photographs of a location), a map including the one or more locations and the one or more locations (e.g., a map with the one or more locations highlighted), one or more textual descriptions of the one or more locations (e.g., one or more natural language sentences describing the one or more locations), and/or one or more auditory descriptions of the one or more locations.

FIG. 8 depicts a flow diagram of an example method for determining suitable locations according to example embodiments of the present disclosure. One or more portions of the method 800 can be executed or implemented on one or more computing devices or computing systems including, for example, the computing device 102, the server computing system 130, and/or the training computing system 150. Further, one or more portions of the method 800 can be executed or implemented as an algorithm on the hardware devices or systems disclosed herein. In some embodiments, one or more portions of the method 800 can be performed as part of the method 700 that is depicted in FIG. 7. Further, one or more portions of the method 800 can be performed as part of determining a suitable location of the one or more locations based at least in part on the location data and the plurality of semantic tags that satisfy the one or more suitability criteria as described in 710 of the method 700 that is depicted in FIG. 7. FIG. 8 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 802, the method 800 can include determining, based at least in part on the location data, one or more paths from an initial location (e.g., the location of a user of a geographic context application) to the one or more locations (e.g., the suitable location determined in the method 700 that is depicted in FIG. 7). For example, the computing device 102 can access map information in the location data to determine one or more paths from the initial location of a user of a geographic context application to the one or more locations.

At 804, the method 800 can include determining a path safety level of each path of the one or more paths based at least in part on the one or more features associated with each location of the one or more locations within a predetermined distance of the one or more paths. For example, the computing device 102 can determine a path safety level of a location based at least in part on the one or more features associated with a hazard (e.g., a highway) that occurs within twenty meters of a path to the location.

At 806, the method 800 can include determining when any of the one or more locations are associated with at least one path of the one or more paths that satisfy one or more path safety criteria. Satisfaction of the one more path safety criteria can be based at least in part on one or more features of the path from the initial location to the one or more locations. For example, the computing device 102 can determine that the one or more path safety criteria for the one or more locations associated with the at least one path are satisfied when a location is associated with a path to the one or more locations that satisfies the one or more path safety criteria by not passing through a hazard (e.g., a highway) and/or when the number of road crossings along a path is less than a threshold rate of road crossings (e.g., less than one road crossing per five hundred meters).

Figure 9:
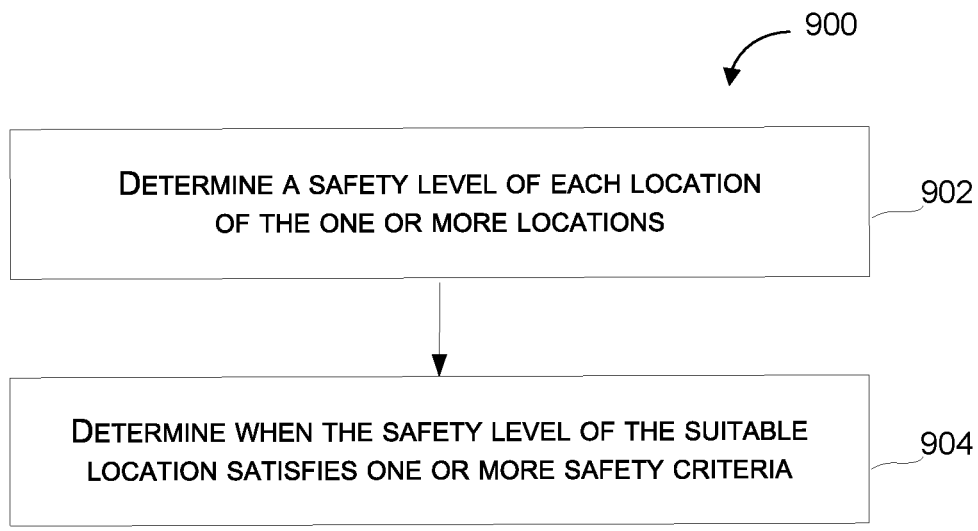
FIG. 9 depicts a flow diagram of determining suitable locations according to example embodiments of the present disclosure.

FIG. 9 depicts a flow diagram of an example method for determining suitable locations according to example embodiments of the present disclosure. One or more portions of the method 900 can be executed or implemented on one or more computing devices or computing systems including, for example, the computing device 102, the server computing system 130, and/or the training computing system 150. Further, one or more portions of the method 900 can be executed or implemented as an algorithm on the hardware devices or systems disclosed herein. In some embodiments, one or more portions of the method 900 can be performed as part of the method 800 that is depicted in FIG. 8. Further, one or more portions of the method 900 can be performed as part of determining a suitable location of the one or more locations based at least in part on the location data and the plurality of semantic tags that satisfy the one or more suitability criteria as described in 710 of the method 700 that is depicted in FIG. 7. FIG. 9 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 902, the method 900 can include determining a safety level of each location of the one or more locations based at least in part on the location data and/or the plurality of semantic tags. For example, the computing device 102 can determine a safety level of a location based at least in part on the location data that indicates the amount of vehicular traffic passing through a location at various time intervals (e.g., the amount of vehicular traffic at different times of day and/or different days of the week). By way of further example, the computing device 102 can determine the safety level of each location of the one or more locations based at least in part on the plurality of semantic tags that indicate street lights, bus stops, restaurants, and/or shops.

At 904, the method 900 can include determining that the one or more suitability criteria for each location is at least partly satisfied (e.g., partial satisfaction of the suitability criteria can include complete satisfaction of the one or more suitability criteria or some lesser portion of complete satisfaction of the one or more suitability criteria) when the safety level of each respective location satisfies one or more safety criteria (e.g., safety criteria associated with increased safety at a location). For example, the computing device 102 can determine that the safety level of a location with no vehicular traffic (e.g., the middle of a playground) satisfies the one or more safety criteria. By way of further criteria, a location with abundant, high-speed, vehicular traffic (e.g., the middle of an interstate highway) may not satisfy the one or more safety criteria.

In some embodiments, determining that the safety level of the one or more locations satisfies one or more safety criteria can include: determining that a location of the one or more locations exceeds a minimum distance (e.g., a minimum distance in meters) to a road; determining that a location of the one or more locations exceeds a minimum distance to a predefined elevation change boundary; determining that an amount of pedestrian traffic (e.g., a number of pedestrians in an area per minute) within a predetermined distance of a location of the one or more locations exceeds a pedestrian traffic threshold (e.g., the number of pedestrians per minute exceeds a pedestrians per minute threshold).

Figure 10:
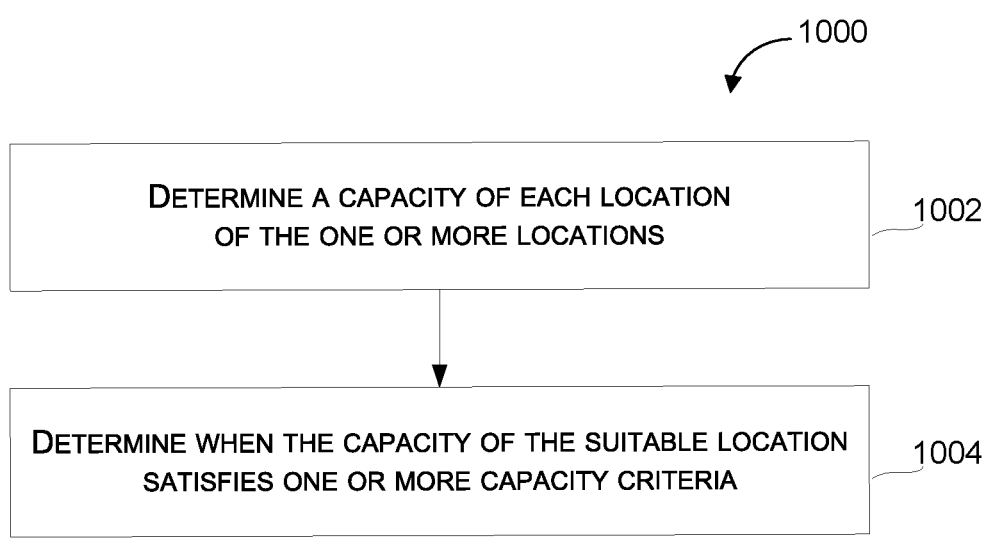
FIG. 10 depicts a flow diagram of determining suitable locations according to example embodiments of the present disclosure.

FIG. 10 depicts a flow diagram of an example method for determining suitable locations according to example embodiments of the present disclosure. One or more portions of the method 1000 can be executed or implemented on one or more computing devices or computing systems including, for example, the computing device 102, the server computing system 130, and/or the training computing system 150. Further, one or more portions of the method 1000 can be executed or implemented as an algorithm on the hardware devices or systems disclosed herein. In some embodiments, one or more portions of the method 1000 can be performed as part of the method 800 that is depicted in FIG. 8. Further, one or more portions of the method 1000 can be performed as part of determining a suitable location of the one or more locations based at least in part on the location data and the plurality of semantic tags that satisfy the one or more suitability criteria as described in 710 of the method 700 that is depicted in FIG. 7. FIG. 10 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1002, the method 1000 can include determining a capacity of each location of the one or more locations based at least in part on the location data and/or the plurality of semantic tags associated with each location of the one or more locations. For example, the computing device 102 can determine a capacity of a location based at least in part on the location data associated with the ground area (e.g., an area in square meters) of a location.

At 1004, the method 1000 can include determining that the one or more suitability criteria for each location is at least partly satisfied when the capacity of each respective location satisfies one or more capacity criteria. For example, the computing device 102 can determine that the suitable location satisfies the one or more capacity criteria when the area of the suitable location exceeds a capacity threshold (e.g., the area is greater than sixty square meters).

In some embodiments, determining that the capacity of the suitable location satisfies one or more capacity criteria can include determining that a location of the one or more locations exceeds a minimum physical area (e.g., a minimum area in square meters) or determining that a location of the one or more locations exceeds a minimum pedestrian capacity (e.g., a minimum number of pedestrians permitted in an area).

Figure 11:
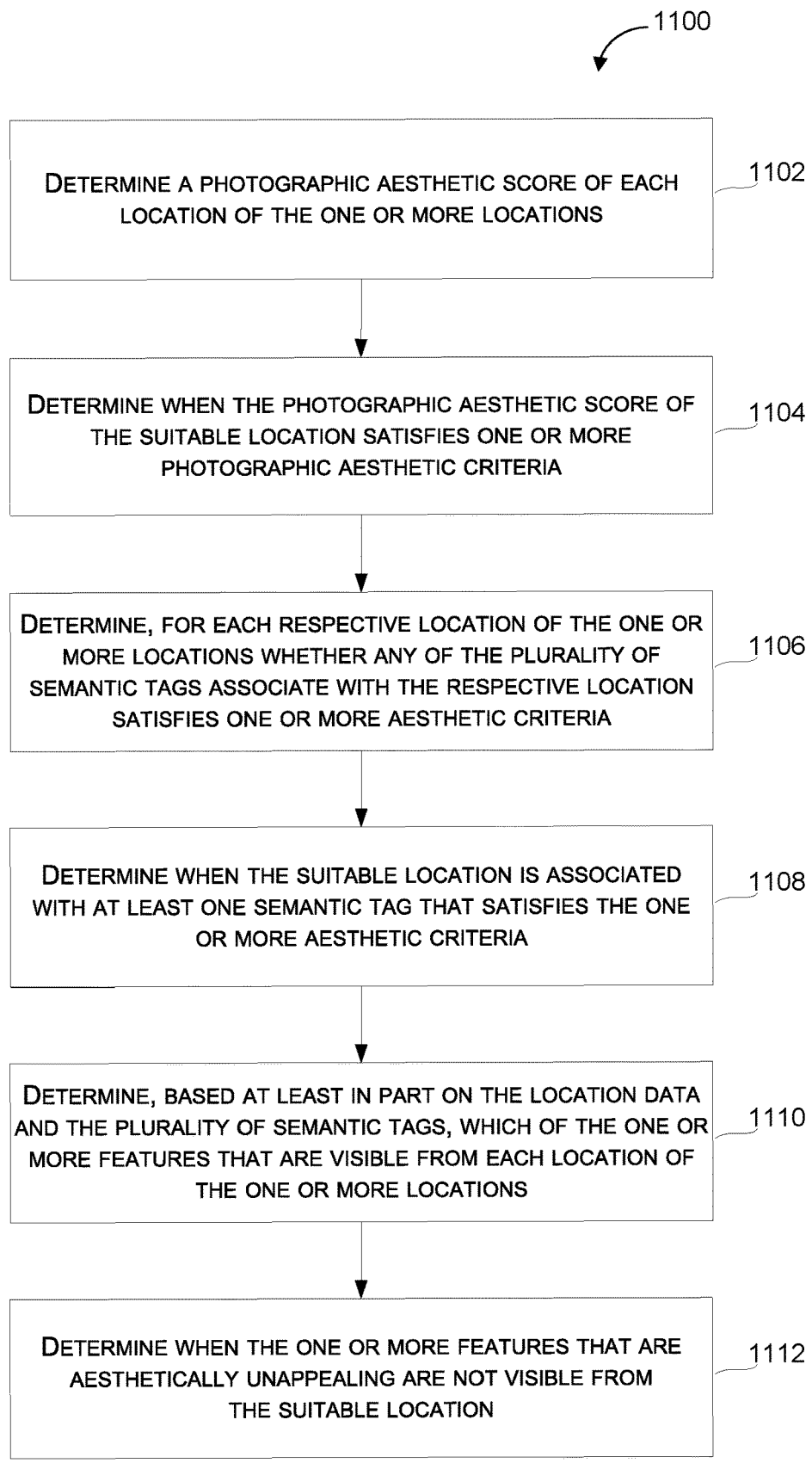
FIG. 11 depicts a flow diagram of determining suitable locations according to example embodiments of the present disclosure.

FIG. 11 depicts a flow diagram of an example method for determining suitable locations according to example embodiments of the present disclosure. One or more portions of the method 1100 can be executed or implemented on one or more computing devices or computing systems including, for example, the computing device 102, the server computing system 130, and/or the training computing system 150. Further, one or more portions of the method 1100 can be executed or implemented as an algorithm on the hardware devices or systems disclosed herein. In some embodiments, one or more portions of the method 1100 can be performed as part of the method 800 that is depicted in FIG. 8. Further, one or more portions of the method 1100 can be performed as part of determining a suitable location of the one or more locations based at least in part on the location data and the plurality of semantic tags that satisfy the one or more suitability criteria as described in 710 of the method 700 that is depicted in FIG. 7. FIG. 11 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1102, the method 1100 can include determining a photographic aesthetic score for each location of the one or more locations based at least in part on the location data and/or the plurality of semantic tags. The photographic aesthetic score can be associated with a number of photographs captured (e.g., a total number of photographs captured at a location) at each of the one or more locations location and/or a rate of photographs captured at each of the one or more locations (e.g. an average number of photographs captured each day). In some embodiments, a higher or increased photographic aesthetic score can correspond to a location that is more aesthetically appealing and can correspond to a greater likelihood that a location is determined to be a suitable location.

For example, the computing device 102 can access data associated with the plurality of semantic tags to determine how many photographs were captured at a location in a particular time period (e.g., the past year). By way of further example, a more frequently photographed location may be determined to be more aesthetically pleasing than a less photographed location. In some implementations, the computing device 102 can determine the amount of photographs captured at a location by accessing data (e.g., data stored at one or more remote image databases and/or local image databases) associated with a frequency and/or number of photographs taken at a particular location.

At 1104, the method 1100 can include determining when the photographic aesthetic score of the suitable location satisfies one or more photographic aesthetic criteria. For example, the computing device 102 can compare the photographic aesthetic score to a threshold photographic aesthetic score in order to determine that the location has a photographic aesthetic score that exceeds the threshold photographic aesthetic score and thereby satisfies the one or more photographic aesthetic criteria.

At 1106, the method 1100 can include determining, for each respective location of the one or more locations, when any semantic tag of the plurality of semantic tags associated with the respective location satisfies one or more aesthetic criteria. For example, the computing device 102 can determine, whether a semantic tag associated with a location satisfies an aesthetic criteria based at least in part on whether the respective semantic tag includes positive feedback (e.g., positive user feedback) that corresponds to aesthetic appeal (e.g., written feedback indicating that a location is aesthetically appealing and/or beautiful).

At 1108, the method 1100 can include determining when the suitable location is associated with at least one semantic tag that satisfies the one or more aesthetic criteria. For example, the computing device 102 can determine based on an evaluation of the plurality of semantic tags that the suitable location is associated with a semantic tag that is associated with positive feedback extolling the aesthetic appeal of a location. In some embodiments, the absence of at least one semantic tag associated with a location that satisfies the one or more aesthetic criteria precludes that location from being determined to be suitable.

At 1110, the method 1100 can include determining, based at least in part on the location data and/or the plurality of semantic tags, which of the one or more features associated with each location of the one or more locations are visible. For example, the computing device 102 can use the location data (e.g., location data that can be used to determine the position of objects that may obstruct visibility) and the plurality of semantic tags at locations within a predetermined distance of a particular location to determine the presence of various features (e.g., objects including trees, buildings, benches, and/or playgrounds) that are visible at the particular location.

At 1112, the method 1100 can include determining when any visible feature associated with each respective location is not aesthetically appealing. For example, the computing device 102 can determine that the suitable location is not associated with any aesthetically unappealing features (e.g., garbage piles, construction sites, and/or scrap yards) that are visible. In some embodiments, the visibility from a location of any features that are aesthetically unappealing precludes that location from being determined to be suitable.

Figure 12:
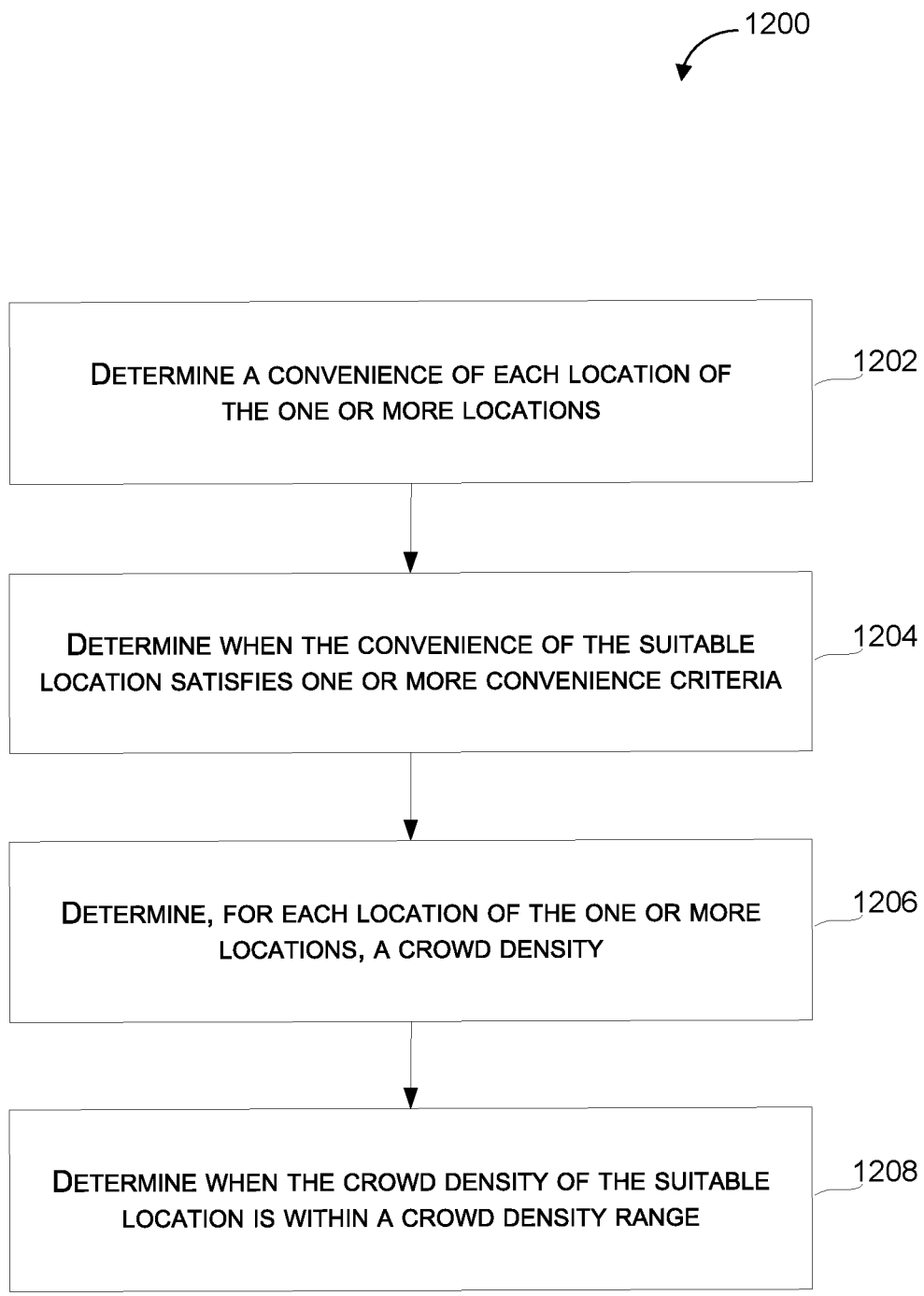
FIG. 12 depicts a flow diagram of determining suitable locations according to example embodiments of the present disclosure.

FIG. 12 depicts a flow diagram of an example method for determining suitable locations according to example embodiments of the present disclosure. One or more portions of the method 1200 can be executed or implemented on one or more computing devices or computing systems including, for example, the computing device 102, the server computing system 130, and/or the training computing system 150. Further, one or more portions of the method 1200 can be executed or implemented as an algorithm on the hardware devices or systems disclosed herein. In some embodiments, one or more portions of the method 1200 can be performed as part of the method 800 that is depicted in FIG. 8. Further, one or more portions of the method 1200 can be performed as part of determining a suitable location of the one or more locations based at least in part on the location data and the plurality of semantic tags that satisfy the one or more suitability criteria as described in 710 of the method 700 that is depicted in FIG. 7. FIG. 12 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1202, the method 1200 can include determining a convenience of each location of the one or more locations based at least in part on the location data and/or the plurality of semantic tags associated with each location of the one or more locations. For example, the computing device 102 can access the location data to determine the convenience of a location based at least in part on an amount of pedestrian traffic through a location and the intended use and/or function of the location (e.g., determining whether the location is used for recreation or as a thoroughfare).

At 1204, the method 1200 can include determining when the convenience of the one or more locations satisfies one or more convenience criteria. For example, the computing device 102 can determine that a location with lavatories and pedestrian traffic within a specified range (e.g., the pedestrian traffic is not too sparse or too dense) satisfies one or more convenience criteria.

In some embodiments, determining when the convenience of the one or more locations satisfies one or more convenience criteria can include determining when a number of amenities (e.g., seats and/or lavatories) at a location of the one or more locations exceeds a number of amenities threshold or determining when an amount of pedestrian traffic (e.g., a rate of pedestrians per minute that pass through an area) at a location of the one or more locations is less than a pedestrian traffic threshold.

At 1206, the method 1200 can include determining, for each location of the one or more locations, a crowd density based at least in part on an amount of people at each location of the one or more locations. For example, the computing device 102 can access location data and/or the plurality of semantic tags to determine crowd density based at least in part on the area (e.g., the area in square meters) and the number of people at each location of the one or more locations at various time intervals (e.g., on certain days of the week and/or at certain times of the day).

At 1208, the method 1200 can include determining when the crowd density of the suitable location is within a crowd density range. The computing device 102 can compare the crowd density to the crowd density range to determine when the crowd density is within the crowd density range. The crowd density range can be used to exclude the one or more locations with a density that is less than (e.g., the number of people is too sparse) or greater than (e.g., the number of people is too crowded) the crowd density range.

Figure 13:
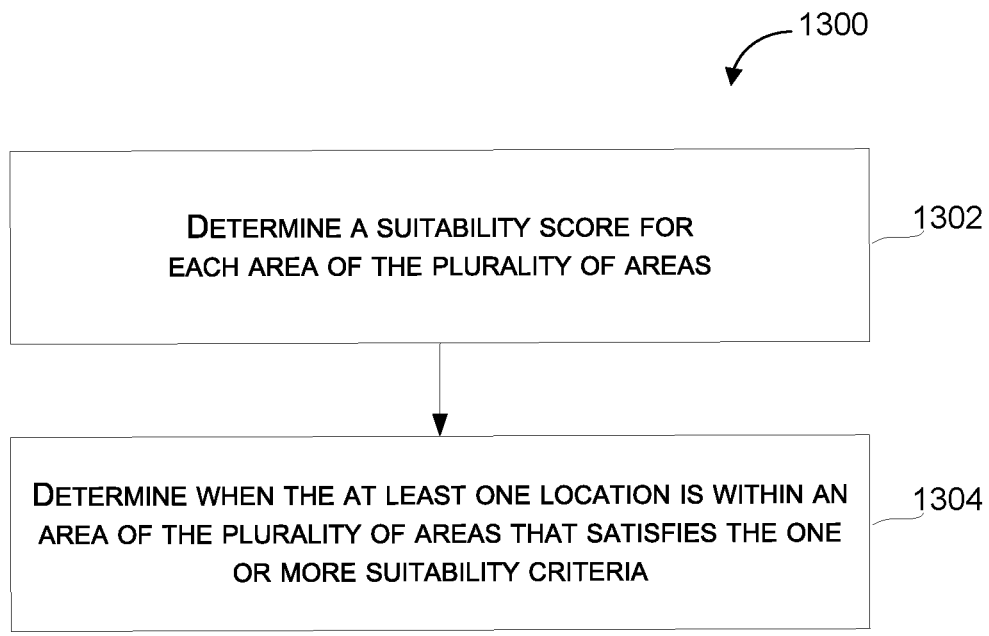
FIG. 13 depicts a flow diagram of determining suitable locations according to example embodiments of the present disclosure.

FIG. 13 depicts a flow diagram of an example method for determining suitable locations according to example embodiments of the present disclosure. One or more portions of the method 1300 can be executed or implemented on one or more computing devices or computing systems including, for example, the computing device 102, the server computing system 130, and/or the training computing system 150. Further, one or more portions of the method 1300 can be executed or implemented as an algorithm on the hardware devices or systems disclosed herein. In some embodiments, one or more portions of the method 1300 can be performed as part of the method 800 that is depicted in FIG. 8. Further, one or more portions of the method 1300 can be performed as part of determining a suitable location of the one or more locations based at least in part on the location data and the plurality of semantic tags that satisfy the one or more suitability criteria as described in 710 of the method 700 that is depicted in FIG. 7. FIG. 13 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1302, the method 1300 can include determining a suitability score for each of the one or more geographic areas (e.g., geographic areas of a predetermined size) based at least in part on an amount of the one or more features that satisfy the one or more suitability criteria within each of the plurality of areas. In some embodiments, a higher or increased suitability score can correspond to a location that is more suitable for use by a geographic context application and can correspond to a greater likelihood that a location is determined to be a suitable location. For example, the computing device 102 can determine the suitability score for each of the plurality of areas by counting the number of the one or more features (e.g., fountains, statues, trees, ancient ruins, and/or murals) in each area that satisfy the one or more suitability criteria associated with aesthetic appealing features and subtracting the number of the one or more features that are aesthetically unappealing (e.g., garbage piles and construction zones).

At 1304, the method 1300 can include determining when the suitable location is associated with a geographic area with a suitability score that satisfies one or more suitability criteria (e.g., a suitability score that exceeds a suitability score threshold). For example, the computing device 102 can determine that the suitable location is within the geographic area with the highest suitability score.

In some embodiments, the computing device 102 can determine that a location is suitable based at least in part on determining that the one or more locations are within a geographic area of the one or more geographic areas with the suitability score that exceeds a suitability score threshold.

Figure 14:
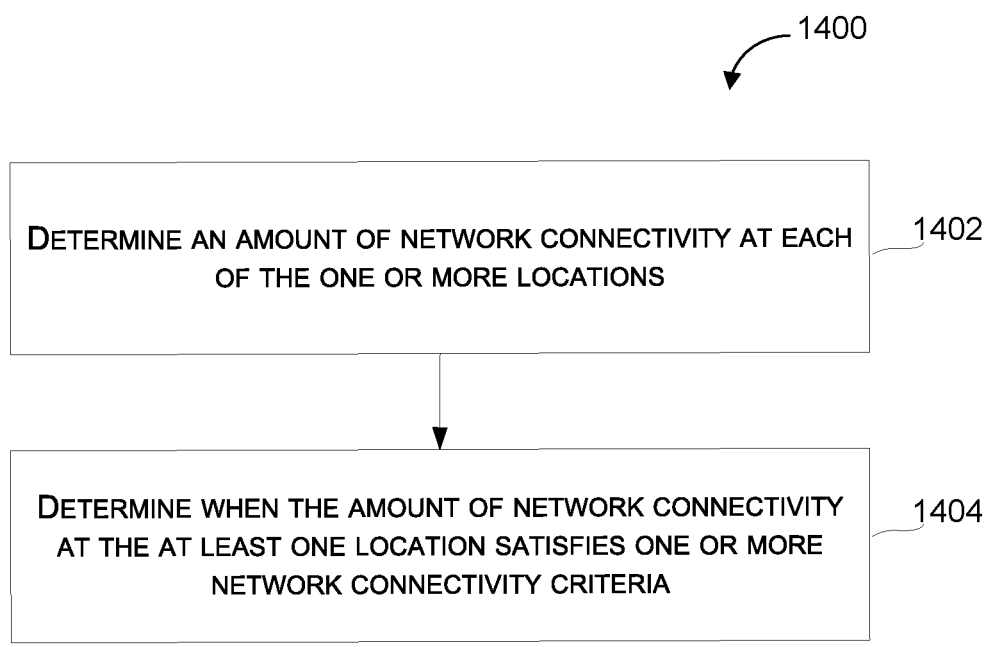
FIG. 14 depicts a flow diagram of determining suitable locations according to example embodiments of the present disclosure.

FIG. 14 depicts a flow diagram of an example method for determining suitable locations according to example embodiments of the present disclosure. One or more portions of the method 1400 can be executed or implemented on one or more computing devices or computing systems including, for example, the computing device 102, the server computing system 130, and/or the training computing system 150. Further, one or more portions of the method 1400 can be executed or implemented as an algorithm on the hardware devices or systems disclosed herein. In some embodiments, one or more portions of the method 1400 can be performed as part of the method 800 that is depicted in FIG. 8. Further, one or more portions of the method 1400 can be performed as part of determining a suitable location of the one or more locations based at least in part on the location data and the plurality of semantic tags that satisfy the one or more suitability criteria as described in 710 of the method 700 that is depicted in FIG. 7. FIG. 14 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1402, the method 1400 can include determining, based at least in part on the location data, an amount of network connectivity at each of the one or more locations. For example, the computing device 102 can access location data including the locations of cellular towers and wireless hotspots in a geographic area to determine the amount of network connectivity at a location and further to determine that the network connectivity satisfies one or more network connectivity by exceeding an available network availability threshold associated with the number of cellular towers and wireless hotspots. By way of further example, the computing device 102 can access location data including information about the amount of network bandwidth (e.g., wireless network bandwidth) that is available in a geographic area to determine the amount of network connectivity at a location and further to determine when the network connectivity satisfies one or more network connectivity by exceeding an available network bandwidth threshold associated with the amount of network bandwidth.

At 1404, the method 1400 can include determining when the amount of network connectivity at the one or more locations satisfies one or more network connectivity criteria (e.g., exceeds a network connectivity threshold associated with an amount of available network bandwidth). For example, the computing device 102 can determine that the amount of network connectivity at the one or more locations exceeds an amount of network connectivity necessary to operate a particular geographic context application (e.g., the network connectivity allows a minimum amount of network bandwidth necessary to operate the geographic context application).

Figure 15:
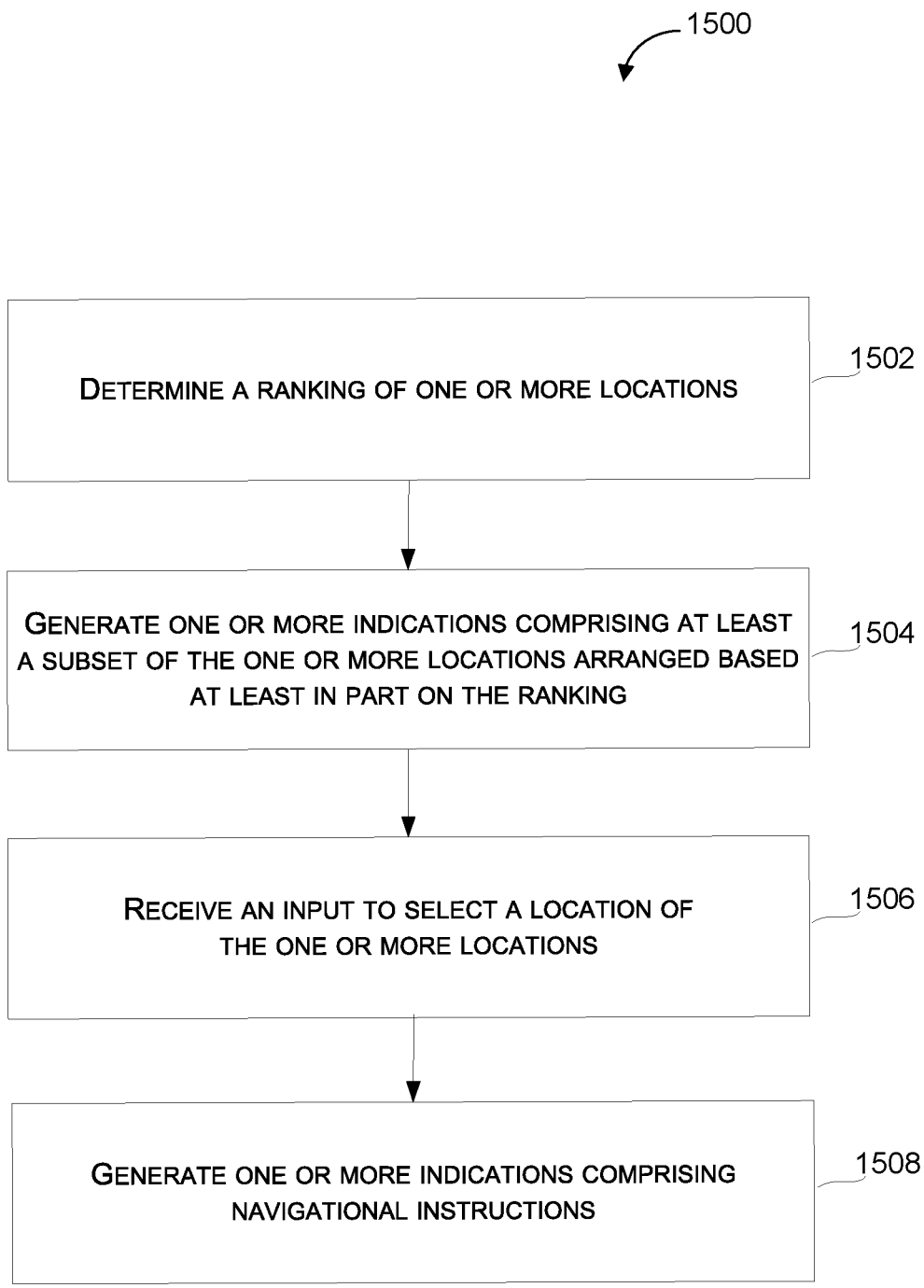
FIG. 15 depicts a flow diagram of determining suitable locations according to example embodiments of the present disclosure.

FIG. 15 depicts a flow diagram of an example method for determining suitable locations according to example embodiments of the present disclosure. One or more portions of the method 1500 can be executed or implemented on one or more computing devices or computing systems including, for example, the computing device 102, the server computing system 130, and/or the training computing system 150. Further, one or more portions of the method 1500 can be executed or implemented as an algorithm on the hardware devices or systems disclosed herein. In some embodiments, one or more portions of the method 1500 can be performed as part of the method 800 that is depicted in FIG. 8. FIG. 15 depicts steps performed in a particular order for purposes of illustration and discussion. Those of ordinary skill in the art, using the disclosures provided herein, will understand that various steps of any of the methods disclosed herein can be adapted, modified, rearranged, omitted, and/or expanded without deviating from the scope of the present disclosure.

At 1502, the method 1500 can include determining a ranking of the one or more locations based at least in part on a proportion of the one or more suitability criteria that are satisfied at each location of the one or more locations. For example, the computing device 102 can rank a location that satisfies three of the suitability criteria higher than a location that satisfies two or fewer of the suitability criteria.

In some embodiments, certain suitability criteria can be weighted more heavily so that certain suitability criteria can account for a greater portion of the one or more suitability criteria. For example, a safety criterion may have more weight than four aesthetic criteria.

At 1504, the method 1500 can include generating one or more indications including a portion of the one or more locations arranged based at least in part on the ranking of the one or more locations. For example, the computing device 102 can generate one or more visible indications (e.g., textual indications arranged with higher ranked locations closer to the top of the display area) displayed on a display device associated with the computing device 102.

At 1506, the method 1500 can include receiving an input to select a location of the one or more locations. For example, the computing device 102 can include a microphone through which the computing device 102 can receive spoken input to select a location of the one or more locations (e.g., "I will go to the first location in the list"). By way of further example, the computing device 102 can receive a touch input from a user on a touch screen display to select a location that is displayed on the touch screen display.

At 1508, the method 1500 can include generating one or more indications including navigational instructions from an initial location (e.g., an initial location of a user of a geographic context application) to the selected location of the one or more locations. For example, the computing device 102 can generate directions (e.g., natural language directions) directing a user of a geographic context application from an initial location to the location selected by the user. In some embodiments, the navigational instructions can include turn by turn instructions that can direct a user as the user proceeds along a path.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method of determining a location suitable for use by a geographic context application, the method comprising:

accessing, by a computing system comprising one or more processors, location data and a plurality of semantic tags associated with one or more locations in a physical environment, wherein each semantic tag is descriptive of one or more features associated with a respective location, and wherein the location data is descriptive of an amount of pedestrian traffic at the one or more locations;

identifying, by the computing system, the location data and the plurality of semantic tags that satisfy one or more suitability criteria associated with suitability of each location for use by a geographic context application, wherein the geographic context application comprises an augmented reality application, and wherein the suitability criteria comprises a safety criteria that is satisfied when the amount of pedestrian traffic at a location of the one or more locations exceeds a pedestrian traffic threshold;

determining, by the computing system, a suitable location of the one or more locations in the physical environment based at least in part on the location data and the plurality of semantic tags that satisfy the one or more suitability criteria;

causing, by the computing system, an element of the augmented reality application to be placed at a location in the augmented reality application, wherein the location in the augmented reality application corresponds to the determined suitable location in the physical environment; and providing, by the computing system, navigational instructions to a user to guide the user to the element of the augmented reality application placed at the determined suitable location in the physical environment.

2. The computer-implemented method of claim 1, wherein the determining, by the computing system, a suitable location of the one or more locations based at least in part on the location data and the plurality of semantic tags that satisfy the one or more suitability criteria comprises:

determining, by the computing system, a safety level of each location of the one or more locations based at least in part on the plurality of semantic tags; and determining, by the computing system, when the safety level of each respective location satisfies the one or more safety criteria.

3. The computer-implemented method of claim 2, wherein the determining, by the computing system, when the safety level of the suitable location satisfies the one or more safety criteria comprises:

determining, by the computing system, when a location of the one or more locations exceeds a minimum distance to a road, determining, by the computing system, when a location of the one or more locations exceeds a minimum distance to a predefined elevation change boundary, or determining, by the computing system, when an amount of pedestrian traffic within a predetermined distance of a location of the one or more locations exceeds the pedestrian traffic threshold.

4. The computer-implemented method of claim 1, wherein the determining, by the computing system, a suitable location of the one or more locations based at least in part on the location data and the plurality of semantic tags that satisfy the one or more suitability criteria comprises:

determining, by the computing system, based at least in part on the location data, one or more paths from an initial location to the one or more locations;

determining, by the computing system, a path safety level of each path of the one or more paths based at least in part on the one or more features associated with each location of the one or more locations within a predetermined distance of the one or more paths; and determining, by the computing system, when any of the one or more locations are associated with at least one path of the one or more paths that satisfy one or more path safety criteria.

5. The computer-implemented method of claim 1, wherein the determining, by the computing system, a suitable location of the one or more locations based at least in part on the location data and the plurality of semantic tags that satisfy the one or more suitability criteria comprises:

determining, by the computing system, a capacity of each location of the one or more locations based at least in part on the plurality of semantic tags associated with each location of the one or more locations; and determining, by the computing system, that the one or more suitability criteria for each location is at least partly satisfied when the capacity of each respective location satisfies one or more capacity criteria.

6. The computer-implemented method of claim 5, wherein the determining, by the computing system, when the capacity of the suitable location satisfies one or more capacity criteria comprises:

determining, by the computing system, when the location of the one or more locations exceeds a minimum physical area, or determining, by the computing system, when the location of the one or more locations exceeds a minimum pedestrian capacity.

7. The computer-implemented method of claim 1, wherein the determining, by the computing system, a suitable location of the one or more locations based at least in part on the location data and the plurality of semantic tags that satisfy the one or more suitability criteria comprises:

determining, by the computing system, a photographic aesthetic score of each location of the one or more locations based at least in part on the plurality of semantic tags, wherein the photographic aesthetic score is based at least in part on a number of photographs captured at each location of the plurality of locations; and determining, by the computing system, when the photographic aesthetic score of the suitable location satisfies one or more photographic aesthetic criteria.

8. The computer-implemented method of claim 1, wherein the determining, by the computing system, a suitable location of the one or more locations based at least in part on the location data and the plurality of semantic tags that satisfy the one or more suitability criteria comprises:

determining, by the computing system, for each respective location of the one or more locations, whether any semantic tag of the plurality of semantic tags associated with the respective location satisfies one or more aesthetic criteria; and determining, by the computing system, when the suitable location is associated with at least one semantic tag that satisfies the one or more aesthetic criteria.

9. The computer-implemented method of claim 1, wherein the determining, by the computing system, a suitable location of the one or more locations based at least in part on the location data and the plurality of semantic tags that satisfy the one or more suitability criteria comprises:

determining, by the computing system, based at least in part on the location data and the plurality of semantic tags, which of the one or more features associated with each location of the one or more locations are visible; and determining, by the computing system, when any visible feature associated with each respective location is not aesthetically appealing.

10. The computer-implemented method of claim 1, wherein determining, by the computing system, a suitable location of the one or more locations based at least in part on the location data and the plurality of semantic tags that satisfy the one or more suitability criteria comprises:

determining, by the computing system, a convenience of each location of the one or more locations based at least in part on the location data associated with each location of the one or more locations; and determining, by the computing system, when the convenience of the suitable location satisfies one or more convenience criteria.

11. The computer-implemented method of claim 10, wherein the determining, by the computing system, when the convenience of the suitable location satisfies one or more convenience criteria comprises:
   determining, by the computing system, when a number of amenities at a location of the one or more locations exceeds a number of amenities threshold, or
   determining, by the computing system, when the amount of pedestrian traffic at a location of the one or more locations is less than a pedestrian traffic convenience threshold.

12. The computer-implemented method of claim 10, wherein each location of the one or more locations is associated with one or more geographic areas in the physical environment, and wherein the determining, by the computing system, a suitable location of the one or more locations based at least in part on the location data and the plurality of semantic tags that satisfy the one or more suitability criteria comprises:
   determining, by the computing system, a suitability score for each of the one or more geographic areas based at least in part on an amount of the one or more features that satisfy the one or more suitability criteria within each of the one or more geographic areas; and
   determining, by the computing system, when the suitable location is associated with a geographic area with a suitability score that satisfies one or more suitability criteria.

13. The computer-implemented method of claim 1, further comprising:
   determining, by the computing system, a type of the geographic context application; and
   determining, by the computing system, a weighting of the one or more suitability criteria based at least in part on the type of the geographic context application.

14. The computer-implemented method of claim 1, wherein the determining, by the computing system, a suitable location of the one or more locations based at least in part on the location data and the plurality of semantic tags that satisfy the one or more suitability criteria comprises:
   determining, by the computing system, based at least in part on the location data, an amount of network connectivity at each of the one or more locations; and
   determining, by the computing system, when the amount of network connectivity at the suitable location satisfies one or more network connectivity criteria.

15. One or more tangible, non-transitory computer-readable media storing computer-readable instructions that when executed by one or more processors cause the one or more processors to perform operations, the operations comprising:
   accessing location data and a plurality of semantic tags associated with one or more locations in a physical environment, wherein each semantic tag is descriptive of one or more features associated with a respective location, and wherein the location data is descriptive of an amount of pedestrian traffic at the one or more locations;
   identifying the location data and the plurality of semantic tags that satisfy one or more suitability criteria associated with suitability of each location for use by a geographic context application, wherein the geographic context application comprises an augmented reality application, and wherein the suitability criteria comprises a safety criteria that is satisfied when the amount of pedestrian traffic at a location of the one or more locations exceeds a pedestrian traffic threshold;
   determining a suitable location of the one or more locations in the physical environment based at least in part on the location data and the plurality of semantic tags that satisfy the one or more suitability criteria;
   causing, by the computing system, an element of the augmented reality application to be placed at a location in the augmented reality application, wherein the location in the augmented reality application corresponds to the determined suitable location in the physical environment; and
   providing, by the computing system, navigational instructions to a user to guide the user to the element of the augmented reality application placed at the determined suitable location in the physical environment.

16. The one or more tangible non-transitory computer-readable media of claim 15, the operations further comprising:
   determining a ranking of the one or more locations based at least in part on a proportion of the one or more suitability criteria that are satisfied at each location of the one or more locations;
   generating one or more indications comprising at least a subset of the one or more locations arranged based at least in part on the ranking of the one or more locations; and
   receiving an input to select a location of the one or more locations; and
   generating one or more indications comprising navigational instructions from an initial location to the location that was selected by the input.

17. The one or more tangible non-transitory computer-readable media of claim 15, further comprising generating one or more indications of the determined suitable location, wherein the one or more indications comprise one or more images of the suitable location, a map comprising the one or more locations and the suitable location, one or more textual descriptions of the suitable location, or one or more auditory descriptions of the suitable location.

18. A computing system comprising:
   one or more processors;
   one or more non-transitory computer-readable media storing instructions that when executed by the one or more processors cause the one or more processors to perform operations comprising:
      accessing location data and a plurality of semantic tags associated with one or more locations in a physical environment, wherein each semantic tag is descriptive of one or more features associated with a respective location, and wherein the location data is descriptive of an amount of pedestrian traffic at the one or more locations in a physical environment;
      identifying the location data and the plurality of semantic tags that satisfy one or more suitability criteria associated with suitability of each location for use by a geographic context application, wherein the geographic context application comprises an augmented reality application, and wherein the suitability criteria comprises a safety criteria that is satisfied when the amount of pedestrian traffic at a location of the one or more locations exceeds a pedestrian traffic threshold;
      determining a suitable location of the one or more locations in the physical environment based at least in part on the location data and the plurality of semantic tags that satisfy the one or more suitability criteria;

causing, by the computing system, an element of the augmented reality application to be placed at a location in the augmented reality application, wherein the location in the augmented reality application corresponds to the determined suitable location in the physical environment; and providing, by the computing system, navigational instructions to a user to guide the user to the element of the augmented reality application placed at the determined suitable location in the physical environment.

19. The computing system of claim 18, wherein the determining a suitable location of the one or more locations based at least in part on the location data and the plurality of semantic tags that satisfy the one or more suitability criteria comprises:

determining, for each location of the one or more locations, the location data that is associated with a crowd density of each location of the one or more locations, wherein the crowd density is based at least in part on an amount of people at each location of the one or more locations; and determining when the location data that is associated with the crowd density of each location of the one or more locations is within a crowd density range.

* * * * *